US009635299B2

(12) United States Patent
Hijikata et al.

(10) Patent No.: US 9,635,299 B2
(45) Date of Patent: Apr. 25, 2017

(54) SOLID-STATE IMAGING DEVICE AND IMAGING APPARATUS INCLUDING AN ADJUSTING CIRCUIT THAT REDUCES AN AMPLITUDE OF A CONTROL SIGNAL FROM A CONTROL UNIT

(71) Applicant: Panasonic Intellectual Property Management Co., Ltd., Osaka (JP)

(72) Inventors: Katsumasa Hijikata, Osaka (JP); Kazuko Nishimura, Kyoto (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 14/626,261

(22) Filed: Feb. 19, 2015

(65) Prior Publication Data
US 2015/0163436 A1    Jun. 11, 2015

Related U.S. Application Data

(63) Continuation of application No. PCT/JP2013/004844, filed on Aug. 12, 2013.

(30) Foreign Application Priority Data

Sep. 10, 2012  (JP) ................................ 2012-198923

(51) Int. Cl.
*H04N 5/378*    (2011.01)
*H04N 5/374*    (2011.01)
*H04N 5/3745*   (2011.01)

(52) U.S. Cl.
CPC ............. *H04N 5/378* (2013.01); *H04N 5/374* (2013.01); *H04N 5/3745* (2013.01)

(58) Field of Classification Search
CPC ....... H04N 5/378; H04N 5/374; H04N 5/3745
(Continued)

(56) References Cited

U.S. PATENT DOCUMENTS 8,035,541 B2 *  10/2011  Onizuka ................. H03M 1/70
                                                        341/139
8,035,696 B2    10/2011  Yamagata et al.
(Continued)

FOREIGN PATENT DOCUMENTS

JP    2004-112077    4/2004
JP    2009-130827    6/2009
(Continued)

OTHER PUBLICATIONS

International Search Report issued in International Application No. PCT/JP2013/004844 on Nov. 12, 2013.

*Primary Examiner* — Que T Le
(74) *Attorney, Agent, or Firm* — Wenderoth, Lind & Ponack, L.L.P.

(57) ABSTRACT

A solid-state imaging device includes: a pixel unit which includes a plurality of pixels arranged in rows and columns and which generates pixel signals according to an amount of incident light; a column analog-to-digital converter (ADC) which is disposed for each of the columns of the pixel unit and which performs digital conversion on each of the pixel signals output from the pixels in the column; a timing control unit which generates a control signal for controlling the digital conversion performed by the column ADC; and a logic swing and delay adjusting circuit which is disposed in a signal path for supplying the control signal from the timing control unit to the column ADC and which at least either reduces an amplitude of the control signal or delays the control signal.

16 Claims, 32 Drawing Sheets

(58) Field of Classification Search
USPC ....... 250/208.1, 214 R, 214.1; 348/294–311; 257/290–292, 440–444
See application file for complete search history.

(56) References Cited

U.S. PATENT DOCUMENTS

| | | |
|---|---|---|
| 8,259,196 B2 | 9/2012 | Yoshikawa et al. |
| 8,530,816 B2 * | 9/2013 | Kume ............... H01L 27/14609 250/208.1 |
| 8,599,279 B2 | 12/2013 | Yamagata et al. |
| 2008/0186388 A1 | 8/2008 | Yamagata et al. |
| 2010/0002120 A1 | 1/2010 | Yoshikawa et al. |
| 2012/0001057 A1 | 1/2012 | Yamagata et al. |
| 2013/0146751 A1 | 6/2013 | Hagihara |

FOREIGN PATENT DOCUMENTS

| | | |
|---|---|---|
| JP | 2010-16656 | 1/2010 |
| JP | 4674589 | 4/2011 |
| JP | 4725608 | 7/2011 |
| WO | 2010-137244 | 12/2010 |
| WO | 2012/017730 | 2/2012 |

* cited by examiner

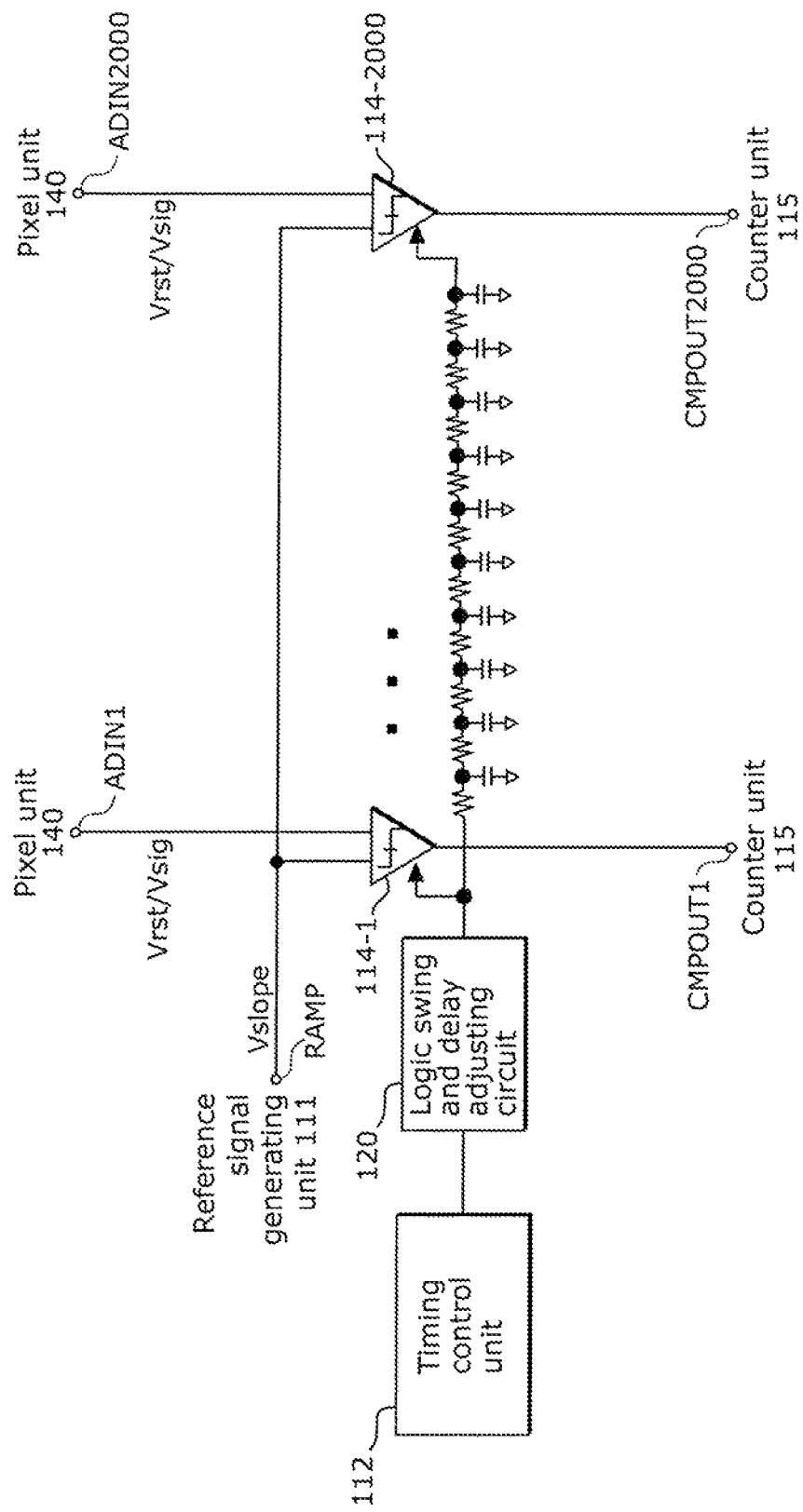

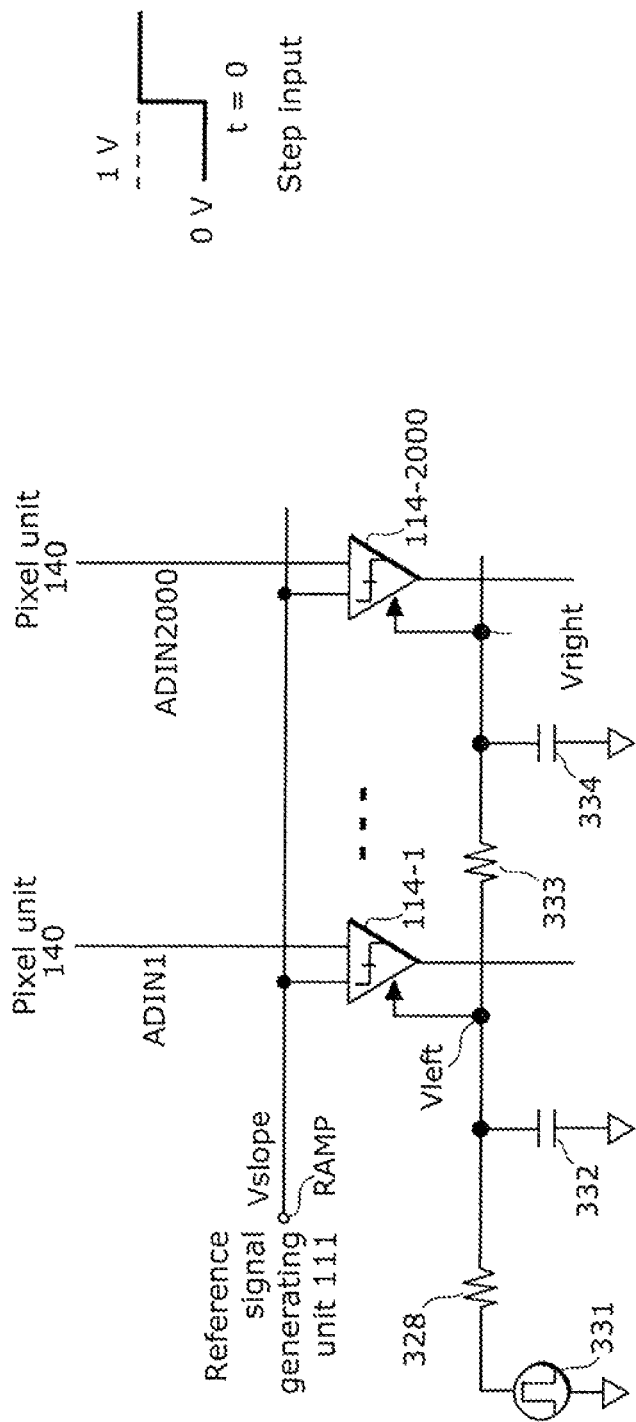

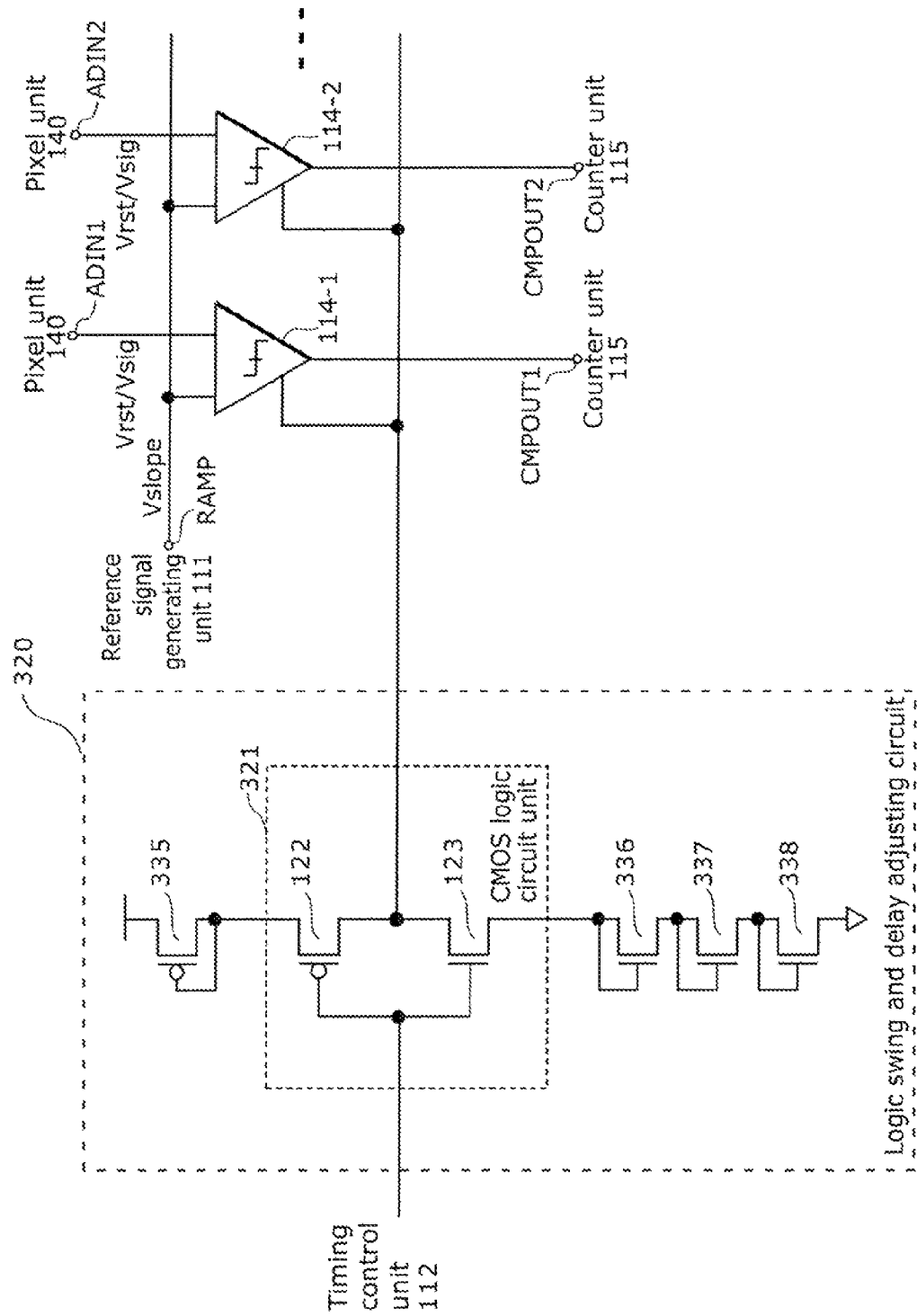

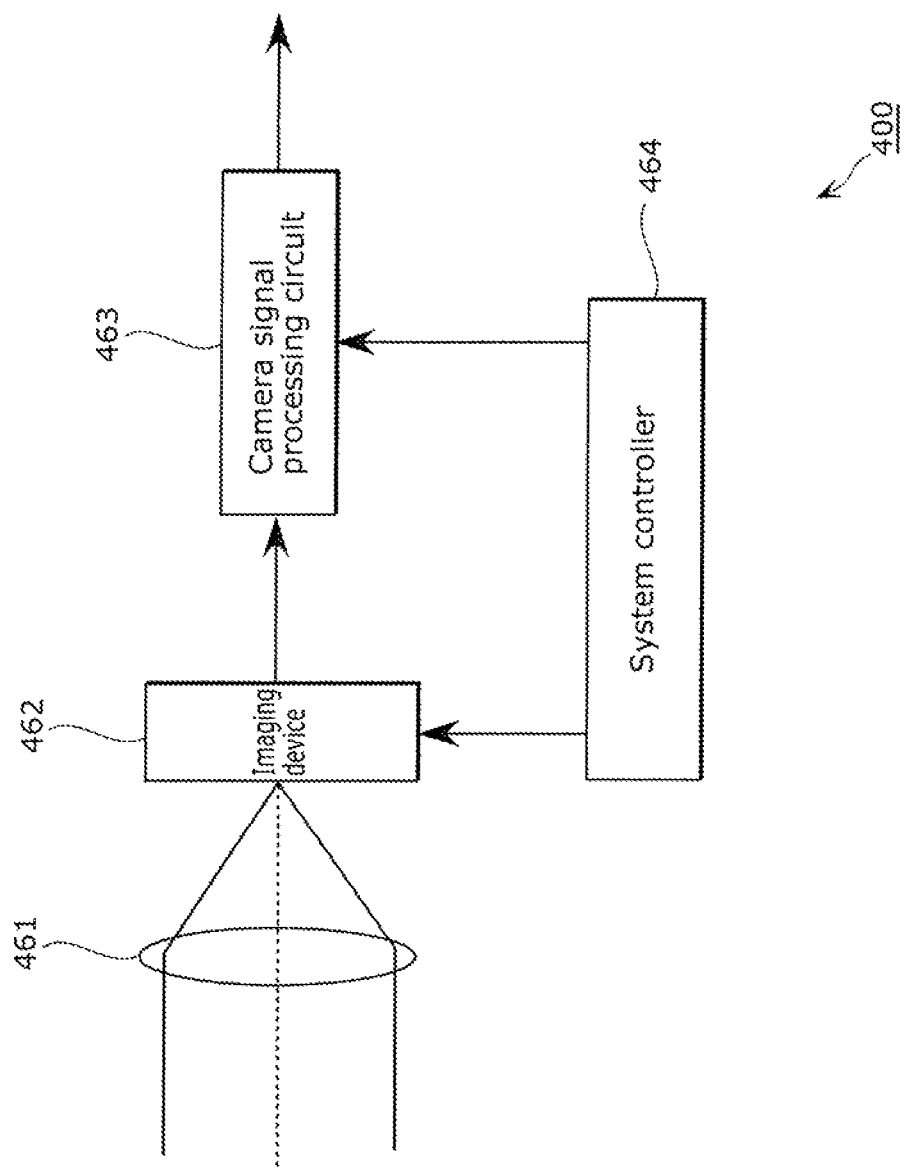

SOLID-STATE IMAGING DEVICE AND IMAGING APPARATUS INCLUDING AN ADJUSTING CIRCUIT THAT REDUCES AN AMPLITUDE OF A CONTROL SIGNAL FROM A CONTROL UNIT

CROSS REFERENCE TO RELATED APPLICATIONS

This is a continuation application of PCT International Application No. PCT/JP2013/004844 filed on Aug. 12, 2013, designating the United States of America, which is based on and claims priority of Japanese Patent Application No. 2012-198923 filed on Sep. 10, 2012. The entire disclosures of the above-identified applications, including the specifications, drawings and claims are incorporated herein by reference in their entirety.

FIELD

The present disclosure relates to solid-state imaging devices and imaging apparatuses.

BACKGROUND

In recent years, a solid-state imaging device has been proposed which reduces variation in output code by minimizing the amount of an offset of a comparator and variation in offset which result in variation in output code (for example, see Patent Literature (PTL) 1).

Referring to FIG. 35, a conventional solid-state imaging device disclosed by PTL 1 will be described.

A comparator 900 illustrated in FIG. 35 includes: a signal input terminal; capacitors C911 and C912 connected between the signal input terminal and a signal line; and switching transistors PT913 and PT914 for calibration which is turned on/off to periodically charge the capacitors C911 and C912 with a voltage difference between a signal voltage and an operating point of the comparator 900. On-resistances of the switching transistors PT913 and PT914, which are turned on when the charging is performed, are dynamically controlled by a control pulse having a limited amplitude.

CITATION LIST

Patent Literature

[PTL 1] Japanese Unexamined Patent Application Publication No. 2010-16656

SUMMARY

Technical Problem

However, the solid-state imaging device disclosed in PTL 1 requires an amplitude to reliably turn on/off the switching transistors for calibration; and thus, there is a limitation on reducing the logic swing of the control pulse of the switching transistors for calibration. Such a limitation results in insufficient reduction in time required for analog-to-digital (AD) conversion, thereby failing to provide a high frame rate.

One non-limiting and exemplary embodiment provides a solid-state imaging device and an imaging apparatus which reduce the time required for AD conversion and provide a high frame rate.

Solution to Problem

A solid-state imaging device according to one aspect of the present disclosure includes: a pixel unit including a plurality of pixels arranged in rows and columns, the pixel unit being configured to generate pixel signals according to an amount of incident light; an analog-to-digital (AD) converting unit which is disposed for each of the columns of the pixel unit, the AD converting unit being configured to perform digital conversion on each of the pixel signals output from the pixels in the column; a control unit which generates a control signal for controlling the digital conversion performed by the AD converting unit; and an adjusting circuit disposed in a signal path for supplying the control signal from the control unit to the AD converting unit, the adjusting circuit at least either reducing an amplitude of the control signal or delaying the control signal.

With this, the solid-state imaging device according to the aspect of the present disclosure controls the respective AD converting units by a control signal approximately simultaneously. In other words, the respective AD converting units perform AD conversion approximately simultaneously. Accordingly, compared with the case where the AD converting units in different columns operate at different times, the time required for AD conversion can be reduced, thereby providing a high frame rate.

Moreover, the solid-state imaging device according to one aspect of the present disclosure may further include a reference signal generating unit which generates a ramp signal having a voltage value which varies along a slope, in which the AD converting unit includes: a comparator which compares each of the pixel signals with the ramp signal; and a counter unit which counts a time period taken by an output of the comparator to be inverted by a change in a magnitude relationship between the each of the pixel signals and the ramp signal, and the control signal is a reset signal for executing auto zero of the comparator.

Accordingly, occurrence of the voltage offset in the comparators in the respective columns can be reduced and the voltage offset in the comparators can be set to be approximately the same. This eliminates the need for processing for absorbing variation in voltage offset.

Moreover, in the solid-state imaging device according to one aspect of the present disclosure, it may be that the AD converting unit is a ΔΣ AD converter including a sample and hold circuit which samples and holds each of the pixel signals, and the control signal is a control clock for the sample and hold circuit.

Moreover, in the solid-state imaging device according to one aspect of the present disclosure, it may be that the AD converting unit is a ΔΣ AD converter including a switched capacitor circuit, and the control signal is a control clock for the switched capacitor circuit.

Accordingly, even at a high frame rate, the ΔΣ AD converters in the respective columns can be controlled approximately simultaneously. Hence, the timing of the control clock in different columns does not vary, leading to reduction in false operation.

Moreover, in the solid-state imaging device according to one aspect of the present disclosure, it may be that the adjusting circuit includes: a CMOS logic circuit which receives the control signal generated by the control unit and outputs a signal of high level or low level according to a voltage of the control signal; and a first resistor having: a first terminal connected to an output terminal of the CMOS logic circuit; and a second terminal electrically connected to the AD converting unit.

Accordingly, the influence of digital noise exerted on the AD converting units can be reduced without excessively increasing the circuit area and power consumption, leading to accurate AD conversion.

Moreover, in the solid-state imaging device according to one aspect of the present disclosure, it may be that the adjusting circuit further includes a second resistor connected between a power supply and the second terminal of the first resistor.

Accordingly, the low-level voltage of the control signal can be increased. In other words, the amplitude of the control signal can be reduced.

Moreover, in the solid-state imaging device according to one aspect of the present disclosure, it may be that wherein the adjusting circuit further includes a third resistor connected between a ground and the second terminal of the first resistor.

Accordingly, the high-level voltage of the control signal can be reduced. In other words, the amplitude of the control signal can be reduced.

Moreover, in the solid-state imaging device according to one aspect of the present disclosure, it may be that the adjusting circuit further includes: a second resistor; a first switch connected in series to the second resistor; a third resistor; and a second switch connected in series to the third resistor, the second resistor and the first switch are connected between a power supply and the second terminal of the first resistor, the third resistor and the second switch are connected between a ground and the second terminal of the first resistor, and when the CMOS logic circuit outputs the signal of low level, the first switch is on, and when the CMOS logic circuit outputs the signal of high level, the first switch is off, and when the CMOS logic circuit outputs the signal of high level, the second switch is on, and when the CMOS logic circuit outputs the signal of low level, the second switch is off.

Accordingly, the high-level voltage of the control signal can be reduced, and the low-level voltage of the control signal can be increased. In other words, the amplitude of the control signal can be reduced.

Moreover, in the solid-state imaging device according to one aspect of the present disclosure, it may be that the third resistor is a variable resistor.

Accordingly, the high-level voltage of the control signal can be reduced to the maximum extent without impairing the operations of the AD converting units. As a result, the time required for AD conversion can be further reduced, providing a higher frame rate. For example, the high-level voltage of the control signal can be reduced without impairing the operations of the AD converting units by reducing the high-level voltage of the control signal while checking the operations of the AD converting units.

Moreover, in the solid-state imaging device according to one aspect of the present disclosure, it may be that the second resistor is a variable resistor.

Accordingly, the low-level voltage of the control signal can be increased to the maximum extent without impairing the operations of the AD converting units. As a result, the time required for AD conversion can be further reduced, providing a higher frame rate. For example, the low-level voltage of the control signal can be increased without impairing the operations of the AD converting units by increasing the low-level voltage of the control signal while checking the operations of the AD converting units.

Moreover, in the solid-state imaging device according to one aspect of the present disclosure, it may be that the first resistor has a resistance value greater than or equal to twice a line resistance value of a line connecting the adjusting circuit and one of the AD converting units which is located farthest from the adjusting circuit.

Accordingly, it is possible to reliably make the time required for rise and fall of the control signal in the AD converting unit located closest to the adjusting circuit approximately equal to the time required for rise and fall of the control signal in the AD converting unit located farthest from the adjusting circuit. In other words, it is possible to reliably cause all of the AD converting units which receive the control signal from the adjusting circuit to operate approximately simultaneously.

Moreover, in the solid-state imaging device according to one aspect of the present disclosure, it may be that the first resistor is a variable resistor.

Accordingly, it is possible to adjust the delay time of the control signal to optimal time. In other words, the delay time of the control signal can be set to the extent that influence of parasitic elements in the line, which connects the adjusting circuit and the respective AD converting units and which is for supplying the control signal, can be ignored, and to the extent that the delay time does not influence the AD conversion time in the AD converting units.

Moreover, in the solid-state imaging device according to one aspect of the present disclosure, it may be that the adjusting circuit includes: a CMOS logic circuit having a first power supply terminal and a second power supply terminal which is connected to a ground, the CMOS logic circuit receiving the control signal generated by the control unit and outputting a signal of high level or low level according to a voltage of the control signal; and an M-stage PMOS transistor including one or more PMOS transistors connected in series and disposed between the first power supply terminal and a power supply, M being an integer of one or greater, and each of the one or more PMOS transistors is a diode-connected transistor.

Accordingly, the control signal can be delayed, and the high-level voltage of the control signal can be reduced. Additionally, the M-stage PMOS transistor reduces the influence exerted on the AD converting units by the digital noise coming from the power supply, leading to accurate AD conversion.

Moreover, in the solid-state imaging device according to one aspect of the present disclosure, it may be that the adjusting circuit includes: a CMOS logic circuit having: a first power supply terminal connected to a power supply; and a second power supply terminal, the CMOS logic circuit receiving the control signal generated by the control unit and outputting a signal of high level or low level according to a voltage of the control signal; and an N-stage NMOS transistor including one or more NMOS transistors connected in series and disposed between the second power supply terminal and a ground, N being an integer of one or greater, and each of the one or more NMOS transistors is a diode-connected transistor.

Accordingly, the control signal can be delayed, and the low-level voltage of the control signal can be increased. Additionally, the N-stage NMOS transistor reduces the influence exerted on the AD converting units by the digital noise coming from the ground, leading to accurate AD conversion.

Moreover, in the solid-state imaging device according to one aspect of the present disclosure, it may be that the adjusting circuit includes: a CMOS logic circuit having: a first power supply terminal and a second power supply terminal, the CMOS logic circuit receiving the control signal generated by the control unit and outputting a signal of high level or low level according to a voltage of the control signal; an M-stage PMOS transistor including one or more PMOS transistors connected in series and disposed between the first power supply terminal and a power supply, M being an integer of one or greater; and an N-stage NMOS transistor including one or more NMOS transistors connected in series and disposed between the second power supply terminal and the ground, N being an integer of one or greater, and each of the one or more PMOS transistors is a diode-connected transistor and each of the one or more NMOS transistors is a diode-connected transistor.

With this, both the high-level voltage and the low-level voltage of the control signal can be adjusted. Additionally, the M-stage PMOS transistor reduces the influence exerted on the AD converting units by the digital noise coming from the power supply, and the N-stage NMOS transistor reduces the influence exerted on the AD converting units by the digital noise coming from the ground. As a result, AD conversion can be accurately performed.

Moreover, an imaging apparatus according to one aspect of the present disclosure includes the solid-state imaging device.

Advantageous Effects

The present disclosure provides a solid-state imaging device which reduces the time required for AD conversion and which provides a high frame rate.

BRIEF DESCRIPTION OF DRAWINGS

These and other objects, advantages and features of the invention will become apparent from the following description thereof taken in conjunction with the accompanying drawings that illustrate a specific embodiment of the present disclosure.

FIG. 10 is a circuit diagram schematically illustrating parasitic elements generated in the line from the timing control unit to the respective comparators in Embodiment 1.

FIG. 20 is a circuit diagram schematically illustrating parasitic elements generated on a line from a timing control unit to respective comparators in Embodiment 2, in a simpler manner than FIG. 10.

FIG. 21 is a graph of a waveform provided from a signal source in Embodiment 2.

FIG. 30 is a graph for illustrating increase in digital noise resistance in the solid-state imaging device according to Embodiment 3.

FIG. 34 is a block diagram illustrating an example of a configuration of an imaging apparatus according to Embodiment 4.

DESCRIPTION OF EMBODIMENTS

Hereinafter, embodiments are described in greater detail with reference to the accompanying Drawings.

Each of the embodiments described below shows a general or specific example. The numerical values, shapes, structural elements, the arrangement and connection of the structural elements etc. shown in the following embodiments are mere examples, and therefore do not limit the present disclosure. Among the structural elements in the following embodiments, structural elements not recited in any one of the independent claims representing the broadest concept of the present disclosure are described as arbitrary structural elements.

(Embodiment 1)

Hereinafter, a solid-state imaging device according to Embodiment 1 will be described in details referring to the accompanying Drawings.

Figure 1:
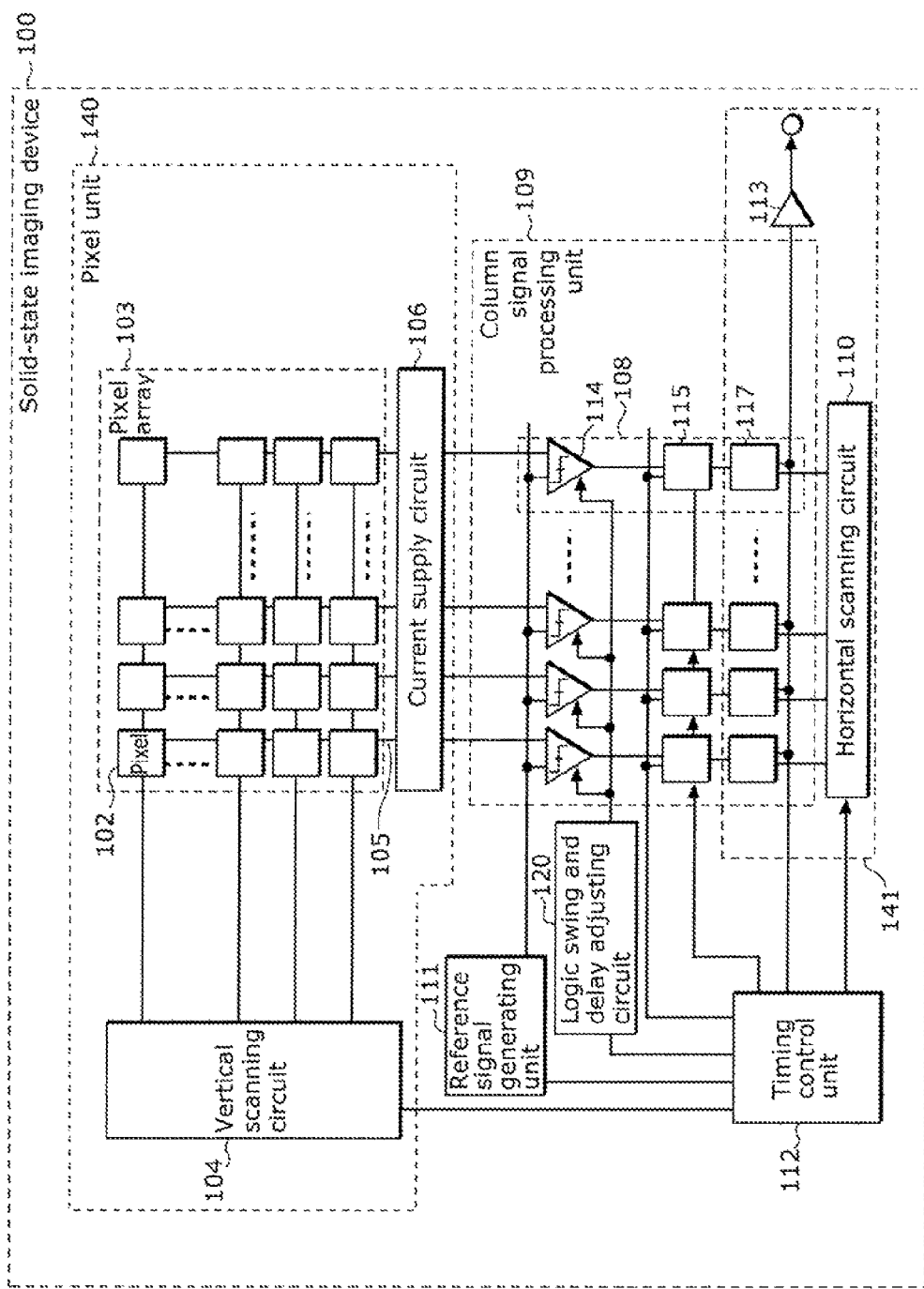
FIG. 1 is a block diagram illustrating an example of an overall configuration of a solid-state imaging device according to Embodiment 1.

FIG. 1 is a block diagram illustrating an overall configuration of a solid-state imaging device according to Embodiment 1.

A solid-state imaging device 100 illustrated in FIG. 1 includes: a pixel unit 140; a column signal processing unit 109; a horizontal scanning circuit 110; a reference signal generating unit 111; a timing control unit 112; an output circuit 113; and a logic swing and delay adjusting circuit 120. The pixel unit 140 includes: a pixel array (may also be referred to as an imaging region) 103 including pixels 102 arranged in rows and columns; a vertical scanning circuit 104; vertical signal lines 105 each disposed for a different one of the columns of the pixels; and a current supply circuit 106. The column signal processing unit 109 includes column analog to digital converters (ADCs) 108 each disposed for a different one of the columns of the pixels. Here, each of the column ADCs 108 includes a comparator 114, a counter unit 115, and a data storage unit 117. The data storage unit 117, the horizontal scanning circuit 110, and the output circuit 113 form a data processing unit 141. The data processing unit 141 performs, for example, digital gain calculation or various correction processing on a digital signal stored in the data storage unit 117, and outputs the processed digital signal to the outside of the solid-state imaging device 100.

The pixel array 103 includes the pixels 102 arranged in rows and columns. The pixel array 103 outputs pixel signals (Vsig) that are signals corresponding to the amount of light received in the pixels 102 to the vertical signal lines 105 each disposed for a different one of the columns of the pixels 102, according to a signal output from the vertical scanning circuit 104 to each row of the pixels.

Now, a detailed configuration of each of the pixels 102 will be described.

Figure 2A:
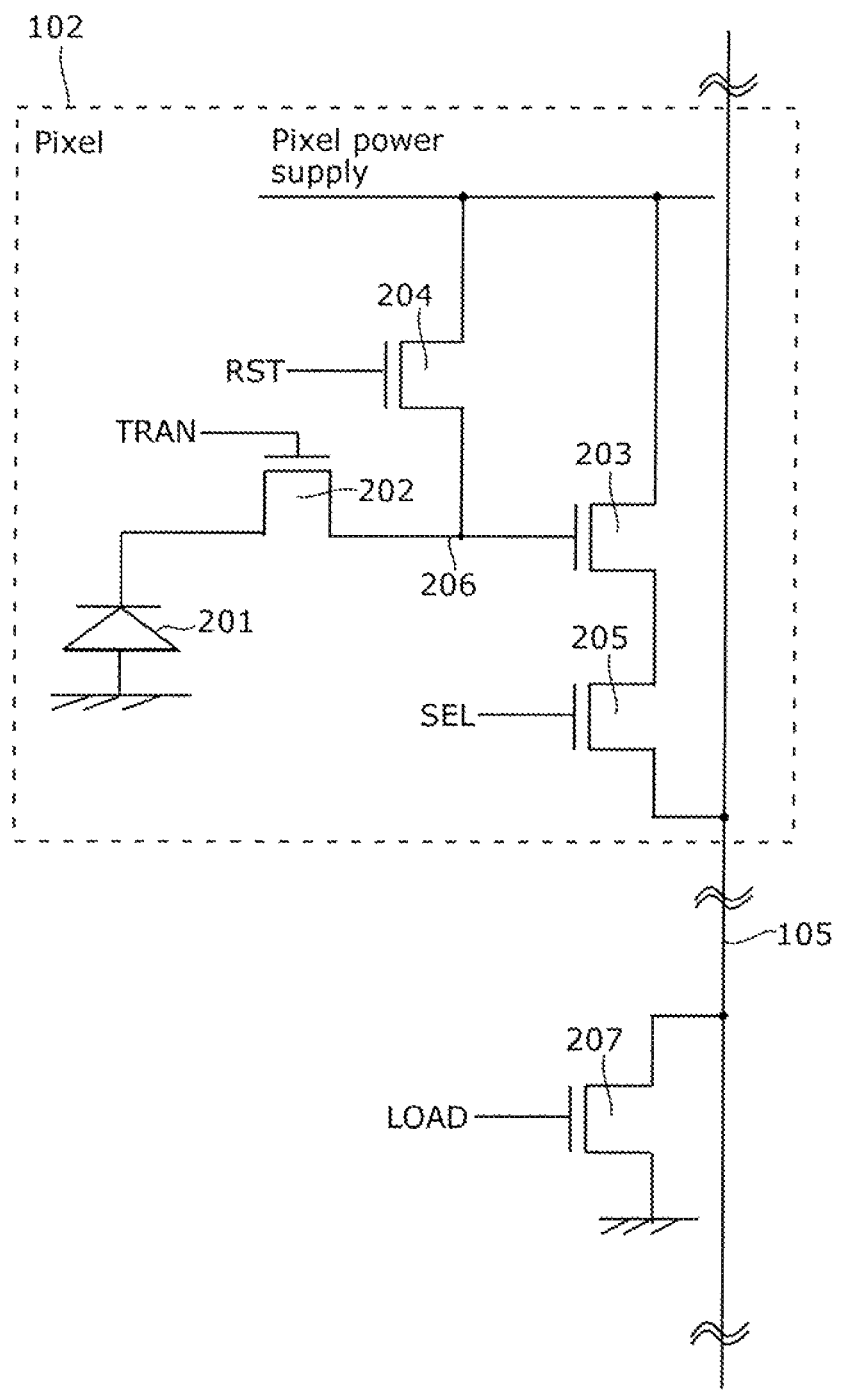
FIG. 2A is a circuit diagram illustrating an example of a configuration of a pixel according to Embodiment 1.

FIG. 2A is a circuit diagram illustrating an example of a configuration of one of the pixels (which may also be referred to as unit cells) 102 in the solid-state imaging device 100 according to Embodiment 1.

As FIG. 2A illustrates, the pixel 102 includes pixel transistors such as a transfer transistor 202, an amplifying transistor 203, a reset transistor 204, and a selecting transistor 205. The pixel 102 also includes a photodiode 201 which performs photoelectric conversion, and a floating diffusion (FD) 206 which converts, into a signal voltage, the signal charge photoelectrically converted by the photodiode 201. A current supply transistor 207 illustrated in FIG. 2A is included in the current supply circuit 106. The current supply transistor 207 and the amplifying transistor 203 form a source follower circuit.

The vertical scanning circuit 104 provides a transfer pulse signal (TRAN), a selection pulse signal (SEL), a reset pulse signal (RST), and the like to each pixel transistor. Specifically, the vertical scanning circuit 104 sequentially outputs, on a per-row basis of the pixel array 103, signals for controlling the accumulation period of charge generated in each pixel 102 or for reading a pixel signal in each pixel 102.

Each of the column ADCs 108 performs digital conversion on the pixel signal (Vsig) output from the pixel array 103 to generate and hold a digital value corresponding to the pixel signal (Vsig). Specifically, in the column ADC 108, the comparator 114 compares the pixel signal (Vsig) with a ramp signal (Vslope) output from the reference signal generating unit 111. In parallel with the comparison processing, the counter unit 115 performs counting processing. The counter unit 115 counts the time period taken for the ramp signal (Vslope) to reach the pixel signal (Vsig). The data storage unit 117 stores the count value obtained when the ramp signal (Vslope) reaches the pixel signal (Vsig).

The horizontal scanning circuit 110 sequentially outputs the digital signals stored in the data storage unit 117 to the outside of the solid-state imaging device 100 via the output circuit 113 on a per-column basis under control of the timing control unit 112.

The reference signal generating unit 111 generates a ramp signal (Vslope) for AD conversion to be performed by the column ADCs 108, under control of the timing control unit 112.

The timing control unit 112 is an example of the control unit according to the present disclosure. The timing control unit 112 provides, to the vertical scanning circuit 104, the horizontal scanning circuit 110, and the reference signal generating unit 111, clock signals necessary for the operations thereof or pulse signals at predetermined timing. The timing control unit 112 generates a control signal for controlling digital conversion performed by the column ADCs 108, and provides the control signal to the column ADCs 108 via the logic swing and delay adjusting circuit 120.

The logic swing and delay adjusting circuit 120 is an example of the adjusting circuit according to the present disclosure. The logic swing and delay adjusting circuit 120 is disposed in the signal path for supplying the control signal from the timing control unit 112 to the column ADCs 108.

The logic swing and delay adjusting circuit 120 delays the control signal, and reduces the amplitude of the control signal. The control signal is specifically a reset signal for executing auto zero of the comparators 114.

As described above, the solid-state imaging device 100 according to Embodiment 1 includes: the pixel unit 140 which includes the pixels 102 arranged in rows and columns, and generates a pixel signal according to the amount of incident light; the column ADC 108 disposed for each of the columns of the pixel unit 140 and performs digital conversion on the pixel signal output from the pixels 102 in the column; the timing control unit 112 which generates a reset signal for executing auto zero of the comparator 114 in the column ADC 108; and the logic swing and delay adjusting circuit 120 which is disposed in the signal path for supplying the reset signal from the timing control unit 112 to the column ADC 108 and delays the reset signal.

Next, a basic operation of the solid-state imaging device 100 thus configured according to Embodiment 1 will be described.

First, when an RST (H level) is applied to the reset transistor 204, the floating diffusion 206 has a power supply voltage which is transferred to the vertical signal line 105 as a pixel reset signal (Vrst) by the source follower circuit including the amplifying transistor 203 and the current supply transistor 207. Next, when the reset transistor 204 is turned off and a TRAN (H level) is applied to the transfer transistor 202, the light signal charge accumulated in the photodiode 201 is transferred to the floating diffusion 206, and the voltage of the floating diffusion 206 decreases from the power supply voltage according to the amount of light signal charge. The voltage is also transferred to the vertical signal line 105 as a pixel signal (Vsig) by the source follower circuit in a similar manner. When the vertical scanning circuit 104 applies a SEL (H level) to the selecting transistor 205, the pixels 102 in the row become active, and the pixel reset signal (Vrst) and the pixel signal (Vsig) are output to the vertical signal line 105 for each pixel column.

Next, an operation of the column ADC 108 disposed for each pixel column is described. The pixel reset signal (Vrst) output to the vertical signal line 105 is input to one of the input terminals of the comparator 114. A ramp signal (Vslope), which is generated by the reference signal generating unit 111 and varies along a slope, is input to the other input terminals of the comparator 114.

The ramp signal (Vslope) is a signal which linearly varies with a certain slope. The pixel reset signal (Vrst) is compared with the ramp signal (Vslope) by the comparator 114. During the comparison, the counter unit 115 counts clock provided from the timing control unit 112.

When the magnitude relationship is changed between the pixel reset signal (Vrst) and the ramp signal (Vslope), the output of the comparator 114 is inverted, (for example, inverted from H level to L level). When the input clock to the counter unit 115 stops, the counter unit 115 stops. Accordingly, the pixel reset signal (Vrst) is converted into a digital value.

Next, when the charge in the photodiode 201 is transferred and the pixel signal (Vsig) is output from the vertical signal line 105, the pixel signal (Vsig) is compared with the ramp signal (Vslope) and is converted into a digital value in a similar manner to the pixel reset signal (Vrst).

Here, the counter unit 115 performs a down-count operation at the comparison with the pixel reset signal (Vrst), and performs an up-count operation at the comparison with the pixel signal (Vsig). This is equivalent to obtaining the difference between the pixel reset signal (Vrst) and the pixel signal (Vsig), which provides a digital value in which noise components commonly included in both signals have been removed. This method is referred to as correlated double sampling (CDS). The count value of the counter unit 115 after CDS is a digital value, and the AD converting operation ends.

The digital value obtained by AD conversion for each column of the pixels is temporarily held in the data storage unit 117, sequentially transferred in the horizontal direction by the horizontal scanning circuit 110, and is output from the output circuit 113.

In such a manner, the solid-state imaging device 100 according to Embodiment 1 performs accurate AD conversion by causing each comparator 114 to compare the pixel reset signal (Vrst) and the pixel signal (Vsig) obtained from the pixel unit 140 with the ramp signal (Vslope) and to perform CDS.

Figure 2B:
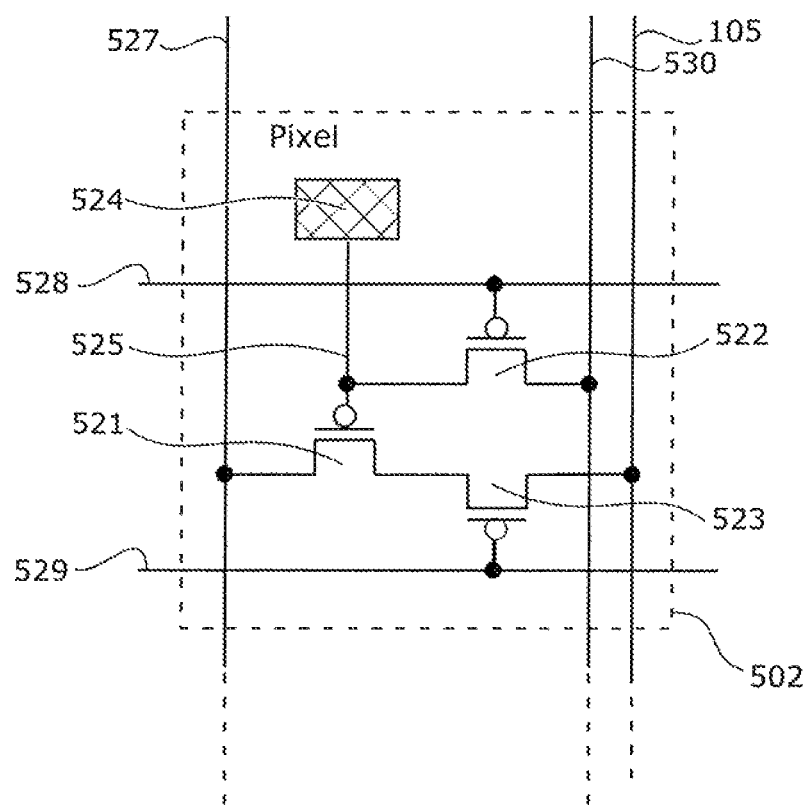
FIG. 2B is a circuit diagram illustrating another example of a configuration of a pixel according to Embodiment 1.

The pixels (unit cells) of the solid-state imaging device 100 according to Embodiment 1 may have the configuration illustrated in FIG. 2B instead of that in FIG. 2A. In FIG. 2B, each of pixels 502 arranged in rows and columns in the pixel unit 140 includes: an amplifying transistor 521; a reset transistor 522; an address transistor 523; a photoelectric conversion element (photoelectric conversion film) 524; and lines connecting these components. The pixel unit 140 generates a pixel signal (Vsig) according to incident light. The amplifying transistor 521 has a source connected to a power supply line 527 running in the vertical direction. The reset transistor 522 has a gate connected to a reset signal line 528 running in the horizontal direction. The address transistor 523 has a gate connected to an address signal line 529 running in the horizontal direction, and a drain connected to a vertical signal line 526 running in the vertical direction.

A feature of the solid-state imaging device 100 according to Embodiment 1 is that the logic swing and delay adjusting circuit 120 is disposed between the timing control unit 112 and the comparators 114. In this regard, detailed descriptions will be given of (i) the problems that occur in the comparators 114 and (ii) a detailed configuration and effects of the logic swing and delay adjusting circuit 120.

(i) Problems that Occur in the Comparators 114

First, in order to facilitate understanding, the problems that occur in the comparators 114 of the solid-state imaging device according to Embodiment 1 will be described.

Figure 3:
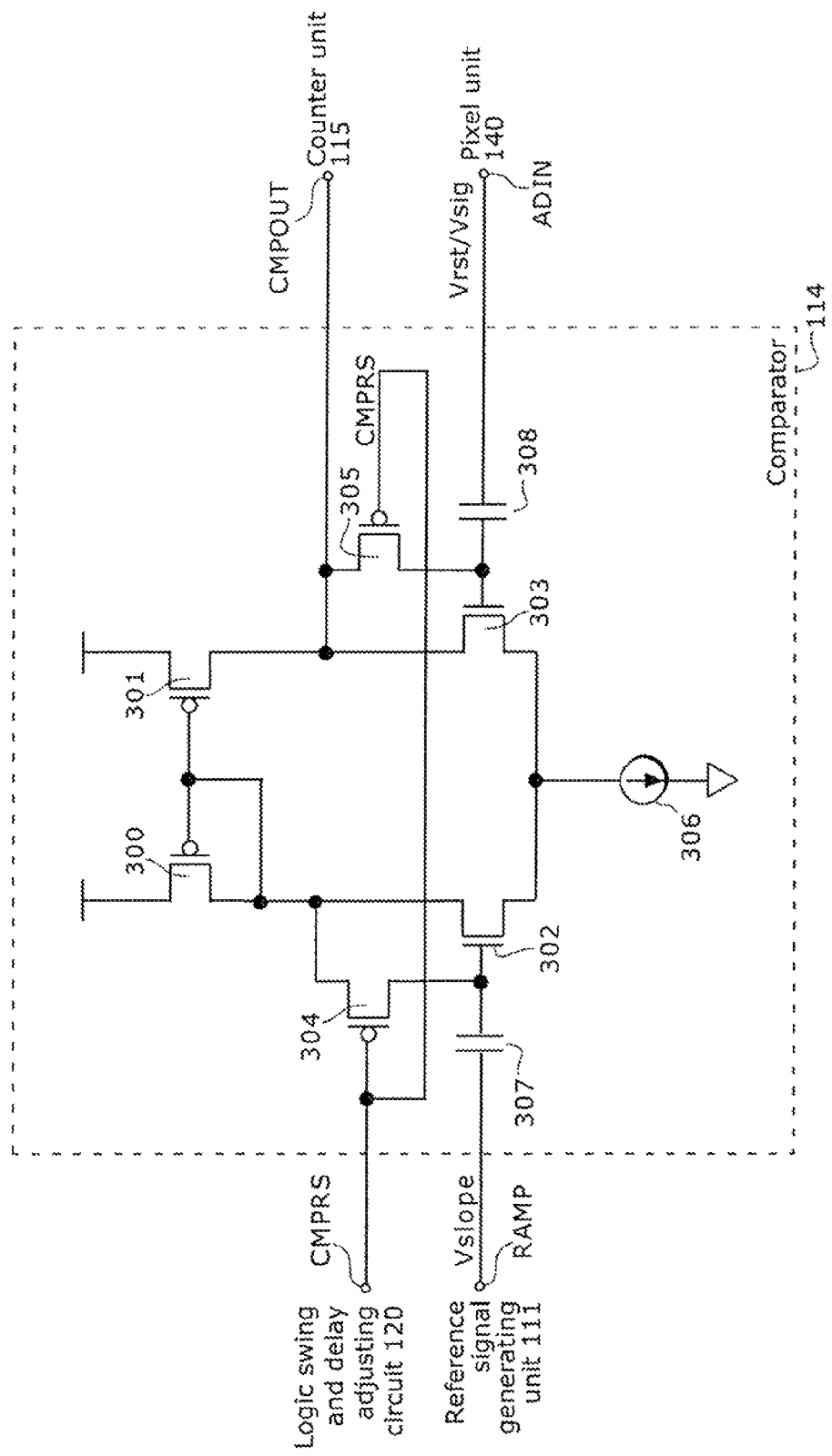
FIG. 3 is a circuit diagram illustrating an example of a configuration of a comparator according to Embodiment 1.

FIG. 3 is a circuit diagram illustrating an example of a configuration of each of the comparators 114 according to Embodiment 1.

FIG. 3 is a diagram for illustrating so-called auto zero. Specifically, auto zero is an operation which is performed before the comparator 114 compares the pixel reset signal (Vrst) with the ramp signal (Vslope) and which sets a reference voltage with a reset signal provided from the timing control unit 112 to cause the comparator 114 to operate with highest sensitivity.

As FIG. 3 illustrates, the comparator 114 of an operating amplifier type includes input transistors 302 and 303, a power supply 306, load transistors 300 and 301, capacitors 307 and 308, and reset transistors 304 and 305. First, the logic swing and delay adjusting circuit 120 supplies a reset signal of L level to a CMPRS terminal to turn on the reset transistors 304 and 305. Here, the gate terminal and the drain terminal of the input transistor 302 are short circuited and the gate terminal and the drain terminal of the input transistor 303 are short circuited, leading to a balanced state of the circuit. As a result, a reference voltage is generated.

Subsequently, when a reset signal of H level is provided to the CMPRS terminal, the reset transistors 304 and 305 are turned off, causing the gate terminals of the input transistors 302 and 303 to float. The difference between the voltage of the RAMP terminal and the gate voltage of the input transistor 302 is held in the capacitor 307, and the difference between the voltage of the ADIN terminal and the gate voltage of the input transistor 303 is held in the capacitor 308. As a result, the magnitude of the voltage level can be compared between the ramp signal (Vslope) provided to the RAMP terminal and the pixel reset signal (Vrst) or the pixel signal (Vsig) provided to the ADIN terminal.

The auto-zero operation in the comparator 114 has been described above.

However, auto zero has such a problem in that when a rest signal for completing the auto zero is provided from the timing control unit 112 (in the example in FIG. 3, a signal which is provided to the CMPRS terminal and which changes from L level to H level), a deviation from the reference voltage, that is, a voltage offset occurs due to the influence of clock feedthrough or charge injection.

Figure 4:
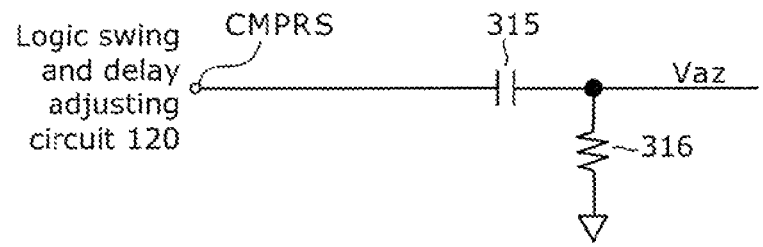
FIG. 4 is a circuit diagram illustrating an equivalent circuit of a reset transistor and a load transistor in the comparator according to Embodiment 1.

Referring to FIG. 4, a description is given to facilitate understanding the problem.

FIG. 4 is a circuit diagram Illustrating an equivalent circuit of the reset transistor 304, the load transistor 300, the reset transistor 305, and the load transistor 301.

In FIG. 4, a capacitor 315 is a single capacitor which approximates the gate-drain capacitance of the reset transistor 304 or the reset transistor 305 and the parasitic capacitance in parallel with the gate-drain capacitance. A resistor 316 is a single resistor which approximates the sum of the on-resistance of the reset transistor 304 and the resistance component of the load transistor 300 or the sum of the on-resistance of the reset transistor 305 and the resistance component of the load transistor 301.

Figure 5:
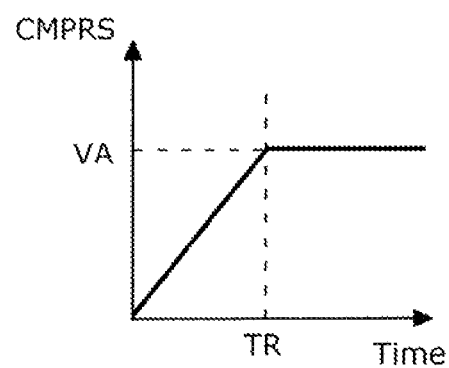
FIG. 5 is a graph of an input waveform provided to the equivalent circuit illustrated in FIG. 4.

Response Vaz obtained when a rise pulse with slope VA/TR as illustrated in FIG. 5 is input to the CR circuit is given by (Equation 1) below. FIG. 5 is a graph of an input waveform provided to the equivalent circuit illustrated in FIG. 4.

[Math. 1]
$$Vaz = RC\frac{VA}{TR}\left(1 - e^{-\frac{1}{RC}t}\right) \quad (0 \leq t \leq TR) \quad \text{(Equation 1)}$$

Figure 6:
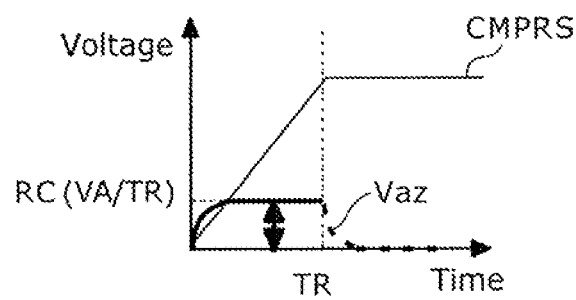
FIG. 6 is a graph of a voltage waveform responsive to the input waveform illustrated in FIG. 5.

FIG. 6 is a graph of the voltage waveform of response Vaz obtained by (Equation 1), and shows voltage RC (VA/TR) proportional to the slope VA/TR of the rise pulse. In an actual operation, the reset transistors 304 and 305 are turned off during the rise of the voltage of the CMPRS terminal. This corresponds to that the resistance value of the resistor 316 in FIG. 4 becomes infinite, which causes the voltage offset of the RC (VA/TR) to be held. In other words, in the drain terminals of the reset transistors 304 and 305, voltage that deviates from the reference voltage by Vaz is held.

In this way, the voltage offset caused at the time of auto zero leads to a deviation from the original count value.

Moreover, in the actual solid-state imaging device 100, parasitic elements are present which are caused by, for example, the parasitic resistance and floating capacitance of a line between the timing control unit 112 and the comparators 114 each provided for the respective columns of the pixel unit 140. Such parasitic elements cause delay time which differs in each column.

The delay time of the reset signal will be described with an example of a solid-state imaging device including no logic swing and delay adjusting circuit 120 as a first comparative example of Embodiment 1.

Figure 7:
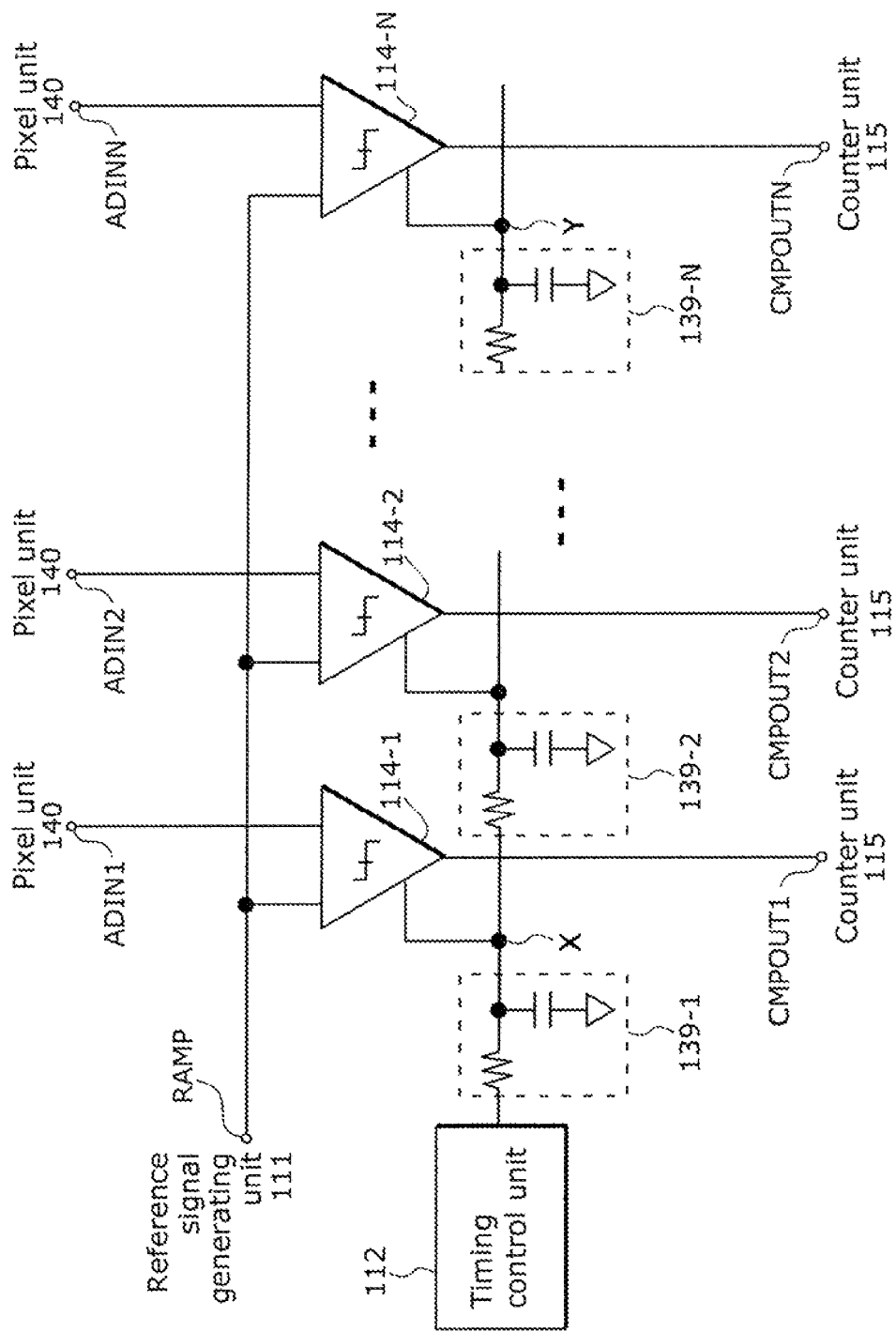
FIG. 7 is a circuit diagram schematically illustrating parasitic elements generated on a line from a timing control unit to the respective comparators in a first comparative example of Embodiment 1.

FIG. 7 is a circuit diagram schematically illustrating parasitic elements generated in the line between the timing control unit 112 and the respective comparators 114 in the solid-state imaging device according to the first comparative example of Embodiment 1. Hereinafter, the comparator 114 belonging to k-th column ($1 \leq k \leq N$) may be referred to as a comparator 114-k, and the ADIN terminal of the comparator 114-k in the k-th column may be referred to as ADIN-k. The comparators 114-1 to 114-k may be referred to as the comparator(s) 114 without particularly distinguishing from each other.

In the actual solid-state imaging device, as illustrated in FIG. 7, RC parasitic elements 139-1 to 139-N are present in a distributed constant manner between the timing control unit 112 and the comparators 114. Accordingly, a sharp rise pulse (having a small TR) is provided to the comparator 114-1 located closest from the timing control unit 112 which generates a reset signal, whereas a slow rise pulse (having a large TR) is provided to the comparator 114-N located farthest from the timing control unit 112. As a result, the amount of voltage offset caused due to clock feedthrough differs in each of the column ADCs 108.

Hence, in the solid-state imaging device according to the first comparative example, at an input of the pixel reset signal (Vrst), each column has a different down count value. Accordingly, the down count needs to be set in such a manner that variation in count value can be sufficiently absorbed. As a result, the time required for AD conversion is greater than that in the case where the count value does not vary, which hinders achievement of a high frame rate.

As described above, the voltage offset held in the drain terminals of the reset transistors 304 and 305 at the time of auto zero differs depending on the distance from the timing control unit 112 to the respective comparators 114-1 to 114-N. In other words, the down count values in the column ADCs 108 at an input of the pixel reset signal (Vrst) are different. As a result, the down count needs to be set in such a manner that the variation in down count value can be absorbed, which results in an increase in the time required for AD conversion. This hinders achievement of a high frame rate.

(ii) Detailed Configuration and Effects of the Logic Swing and Delay Adjusting Circuit 120

In order to solve such problems, the logic swing and delay adjusting circuit 120 in the solid-state imaging device 100 according to Embodiment 1 is provided in a signal path which is from the timing control unit 112 to the comparators 114 and which is for supplying a rest signal for executing auto zero of the comparators 114. The logic swing and delay adjusting circuit 120 delays the rest signal and reduces the amplitude of the rest signal.

Figure 8:
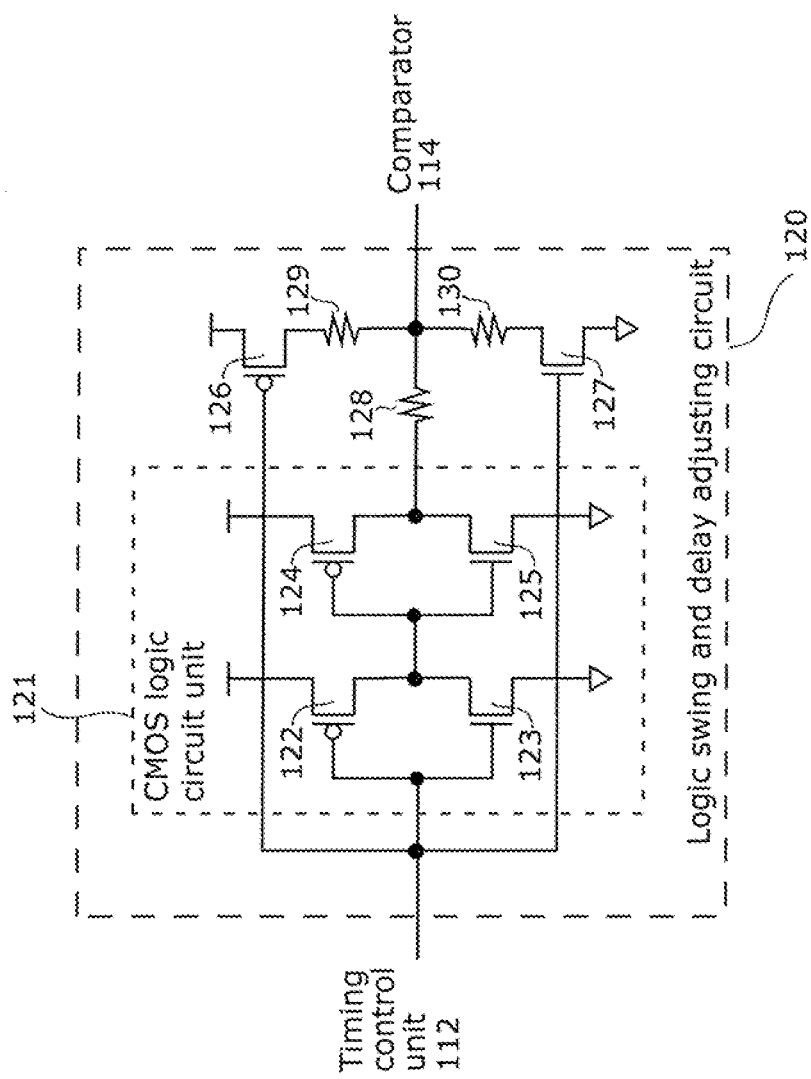
FIG. 8 is a circuit diagram illustrating an example of a configuration of a logic swing and delay adjusting circuit according to Embodiment 1.

FIG. 8 is a circuit diagram illustrating an example of a configuration of the logic swing and delay adjusting circuit 120 according to Embodiment 1.

As illustrated in FIG. 8, the logic swing and delay adjusting circuit 120 includes: a CMOS logic circuit unit 121 of a two-stage inverter including transistors 122, 123, 124, and 125; resistors 128, 129, and 130; and switch transistors 126 and 127.

In the logic swing and delay adjusting circuit 120 in FIG. 8, when a signal of H level (power supply voltage) is input from the timing control unit 112, the first-stage inverter outputs a signal of L level (ground level), and the second-stage inverter outputs a signal of H level. Here, the switch transistor 127 is turned on, making VH, which is the H-level voltage output by the logic swing and delay adjusting circuit 120, a voltage obtained by resistance-dividing the power supply voltage by the resistors 128 and 130. In other words, when VDD is a power supply voltage, R128, R129 and R130 are the resistance values of the resistors 128, 129, and 130, respectively, voltage VH of H level is given by Equation 2 below.

[Math. 2]

$$VH = \frac{R130}{R128 + R130} VDD \qquad \text{(Equation 2)}$$

As described above, the logic swing and delay adjusting circuit 120 includes the resistor 130 connected between the ground and a second terminal of the resistor 128. This reduces the voltage of H level of the reset signal.

On the other hand, when a signal of L level (ground level) is input, the first-stage inverter outputs a signal of H level (power supply voltage), and the second-stage inverter outputs a signal of L level. Here, the switch transistor 126 is turned on, making VL, which is the voltage of L level output by the logic swing and delay adjusting circuit 120, a voltage obtained by resistance-dividing the power supply voltage by the resistors 128 and 129. In other words, the voltage VL of L level is given by Equation 3 below.

[Math. 3]

$$VL = \frac{R128}{R129 + R128} VDD \qquad \text{(Equation 3)}$$

As described above, the logic swing and delay adjusting circuit 120 includes the resistor 129 connected between the power supply and the second terminal of the resistor 128. This increases the voltage of L level of the reset signal. Note that the on-resistances of the transistors 124 and 125 and the on-resistances of the switch transistors 126 and 127 are sufficiently lower than R128, R129, and R130 so that the on-resistances can be ignored.

For example, at the power supply voltage of 3.3 V (VDD=3.3 V) and when the comparator 114 is of an operating amplifier type as illustrated in FIG. 3, it is appropriate to make setting such that VH=2.9 V and VL=1.7 V approximately. Here, at R128=800Ω, R129=800Ω, and R130=6400Ω, VH=2.93 V and VL=1.65 V are respectively given by Equation 2 and Equation 3, thereby achieving a target logic swing approximately. In other words, H level and L level of a reset signal for executing auto zero of the comparator 114, that is, the H level and the L level of a reset signal provided to the reset transistors 304 and 305 of the comparator 114 can have an amplitude for reliably turning on and off the reset transistors 304 and 305.

On the other hand, the output resistance of the logic swing and delay adjusting circuit 120 at the time of releasing reset (at the time of output of VH) is approximately 710Ω (parallel resistance of R128 and R130), which simultaneously provides the delay time of the reset signal as well.

Figure 9:
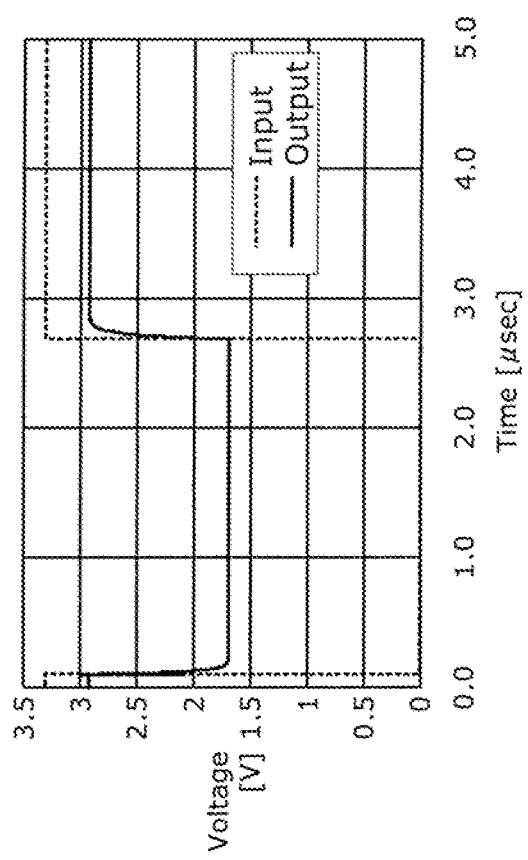
FIG. 9 is a graph of an input waveform and an output waveform of the logic swing and delay adjusting circuit according to Embodiment 1.

FIG. 9 is a graph of the input waveform and the output waveform of the logic swing and delay adjusting circuit 120 at the R128 of 800Ω, the R129 of 800Ω, and the R130 of 6400Ω. As illustrated in FIG. 9, a delay time occurs when the logic swing of the reset signal is reduced by the logic swing and delay adjusting circuit 120.

Figure 11A:
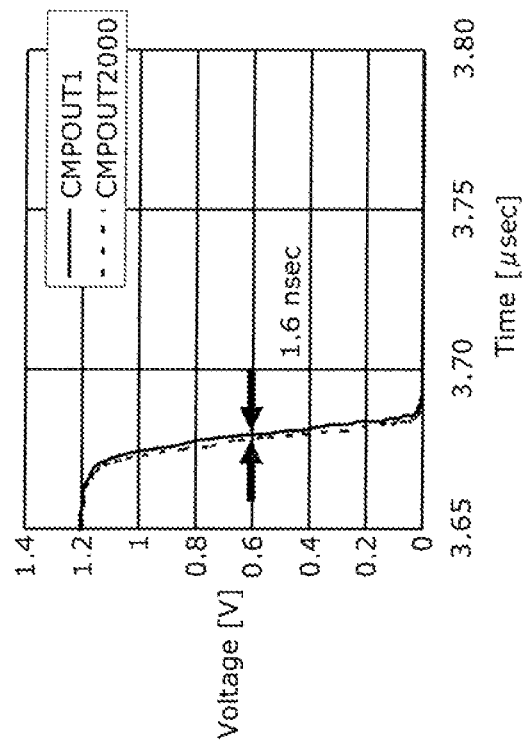
FIG. 11A is a graph of output waveforms of comparators according to the first comparative example of Embodiment 1.
Figure 11B:
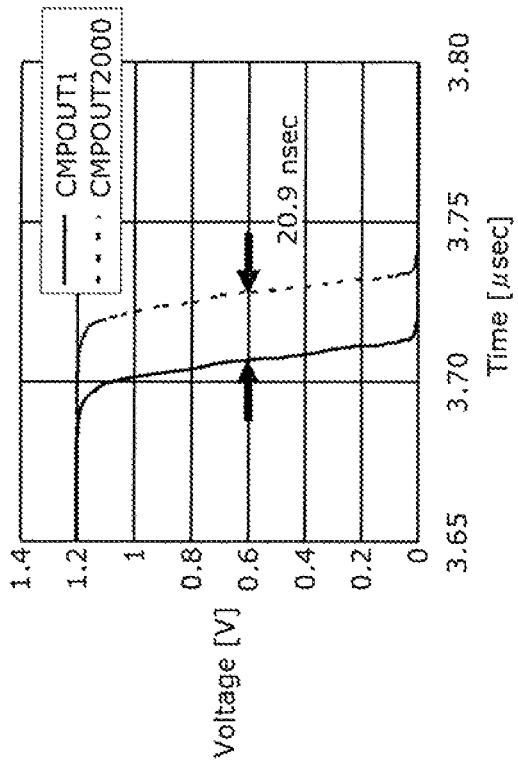
FIG. 11B is a graph of output waveforms of the comparators according to Embodiment 1.

In order to facilitate understanding the above effects, referring to FIGS. 10, 11A and 11B, a description will be given of the effects of the solid-state imaging device 100 according to Embodiment 1 with comparison with the solid-state imaging device according to the above first comparative example including no logic swing and delay adjusting circuit 120. FIG. 10 is a circuit diagram schematically illustrating parasitic elements generated in a line from the timing control unit 112 to the comparators 114 via the logic swing and delay adjusting circuit 120. FIG. 11A is a graph of the output waveforms of the comparators 114 according to the first comparative example of Embodiment 1. FIG. 11B is a graph of the output waveforms of the comparators 114 in the solid-state imaging device 100 according to Embodiment 1.

As FIG. 10 illustrates, for example, the solid-state imaging device 100 includes comparators 114-1 to 114-2000 in 2000 columns. For example, in the first half processing of CDS, a pixel reset signal (Vrst) of the same level is input to the ADIN 1 to the ADIN 2000. When the pixel reset signal (Vrst) is compared with the same ramp signal (Vslope), the outputs of a CMPOUT 1 to a CMPOUT 2000 are ideally inverted at the same time.

However, in the solid-state imaging device according to the first comparative example, due to RC low-pass filters generated in the reset signal line in a distributed constant manner (FIG. 10 approximates 10 RC low-pass filters with an equal interval and each having a resistance value of 10Ω and a capacitance value of 4 pF), the waveforms of the reset signal are gradually rounded from the left-end comparator 114-1 to the right-end comparator 114-2000. Accordingly, each comparator 114 is influenced differently by the clock feedthrough or charge injection, which results in variation in output timing of the comparators 114-1 to 114-2000.

FIG. 11A and FIG. 11B are graphs of the output waveforms of the CMPOUT 1 (the output terminal of the left-end comparator 114-1) and the output waveforms of the CMPOUT 2000 (the output terminal of the right-end comparator 114-2000). FIG. 11A illustrates the output waveforms according to the first comparative example of Embodiment 1 (no logic swing and delay adjusting circuit 120). FIG. 11B illustrates the output waveforms obtained when the logic swing and delay adjusting circuit 120 according to Embodiment 1 is connected. These graphs show that in the first comparative example, a variation of 20.9 nsec is present between the output waveform of the left-end comparator 114-1 and the output waveform of the right-end comparator 114-2000. In contrast, in Embodiment 1, the variation is reduced to 1.6 nsec which is 1/10 of the variation in the first comparative example.

Such a reduction in output variation of the comparators 114 allows the down count to be set small, which leads to reduction in time required for AD conversion. In other words, the amount of offset voltage due to clock feedthrough can be made approximately the same among all the column ADCs 108. Accordingly, the down count for absorbing variation in down count value, which is required in the first comparative example where the amount of offset voltage is large, is unnecessary in Embodiment 1. Hence, in the column ADCs 108 of the solid-state imaging device 100 according to Embodiment 1, the down count value can be set small, and thereby reducing the time required for AD conversion. As a result, it is possible to provide a high-performance solid-state imaging device which provides a high frame rate.

Additionally, in Embodiment 1, it is possible to suppress the digital noise coming to the comparators 114 via the reset signal line.

In general, since the comparator 114 is a circuit block which is easily influenced by digital noise, the comparator 114 is isolated from the power supply. Specifically, power from a digital power supply is provided to the timing control unit 112, and power from an analog power supply is provided to the comparator 114. Even when the comparator 114 is not isolated from the power supply, power is provided from the power supply to the comparator 114 by branching wires so as to avoid a common impedance to the maximum extent. Accordingly, it is possible to reduce propagation of the digital noise, caused by the operation of the timing control unit 112, to the comparator 114 via the power supply. However, in the configuration of the first comparative example including no logic swing and delay adjusting circuit 120, a digital power supply or a digital ground is directly connected with the comparator 114 via a reset signal line. Hence, the digital noise caused by the timing control unit 112 influences the comparator 114.

Figure 12:
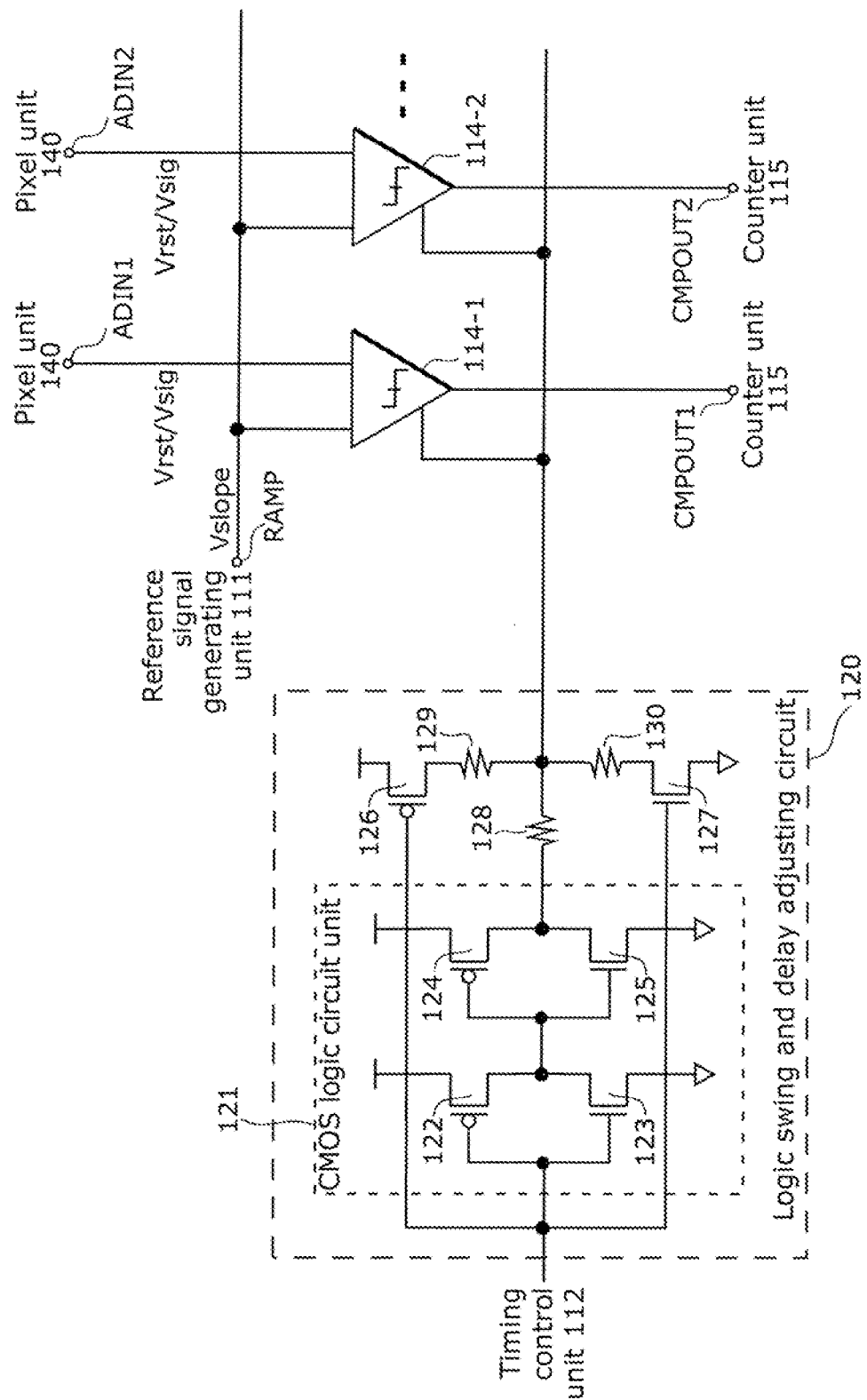
FIG. 12 is a diagram for describing increase in digital noise resistance in the solid-state imaging device according to Embodiment 1.

In contrast, in the solid-state imaging device 100 according to Embodiment 1, as illustrated in FIG. 12, the resistors 128, 129, and 130 connected between the comparators 114 and the digital power supply or the digital ground block the digital noise. This leads to a high-performance solid-state imaging device which is not easily influenced by the digital noise. FIG. 12 is a graph for illustrating increase in digital noise resistance in the solid-state imaging device 100 according to Embodiment 1.

Figure 13:
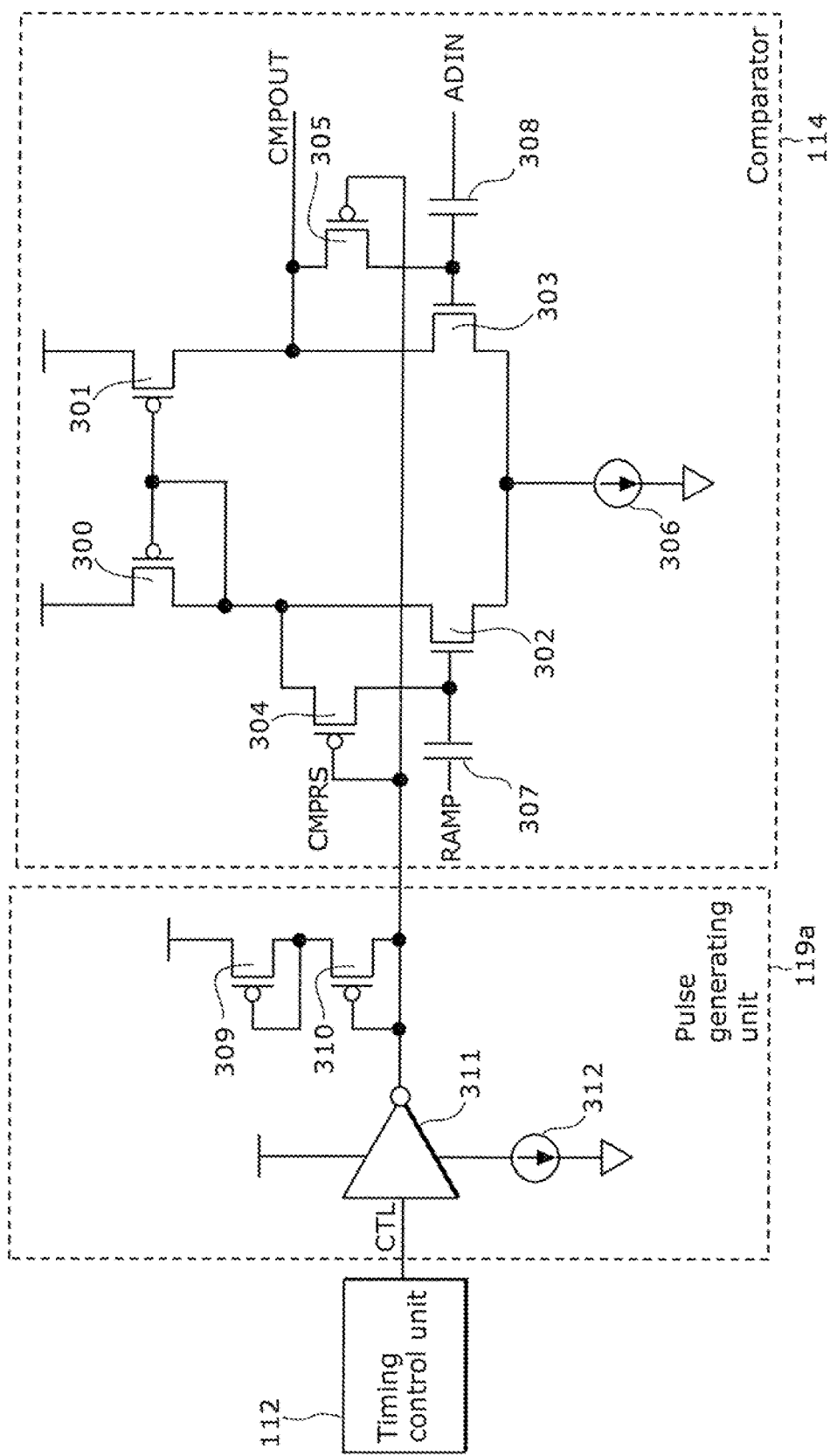
FIG. 13 is a circuit diagram illustrating a configuration of a pulse generating unit and a configuration of a comparator according to an example of the second comparative example of Embodiment 1.
Figure 14:
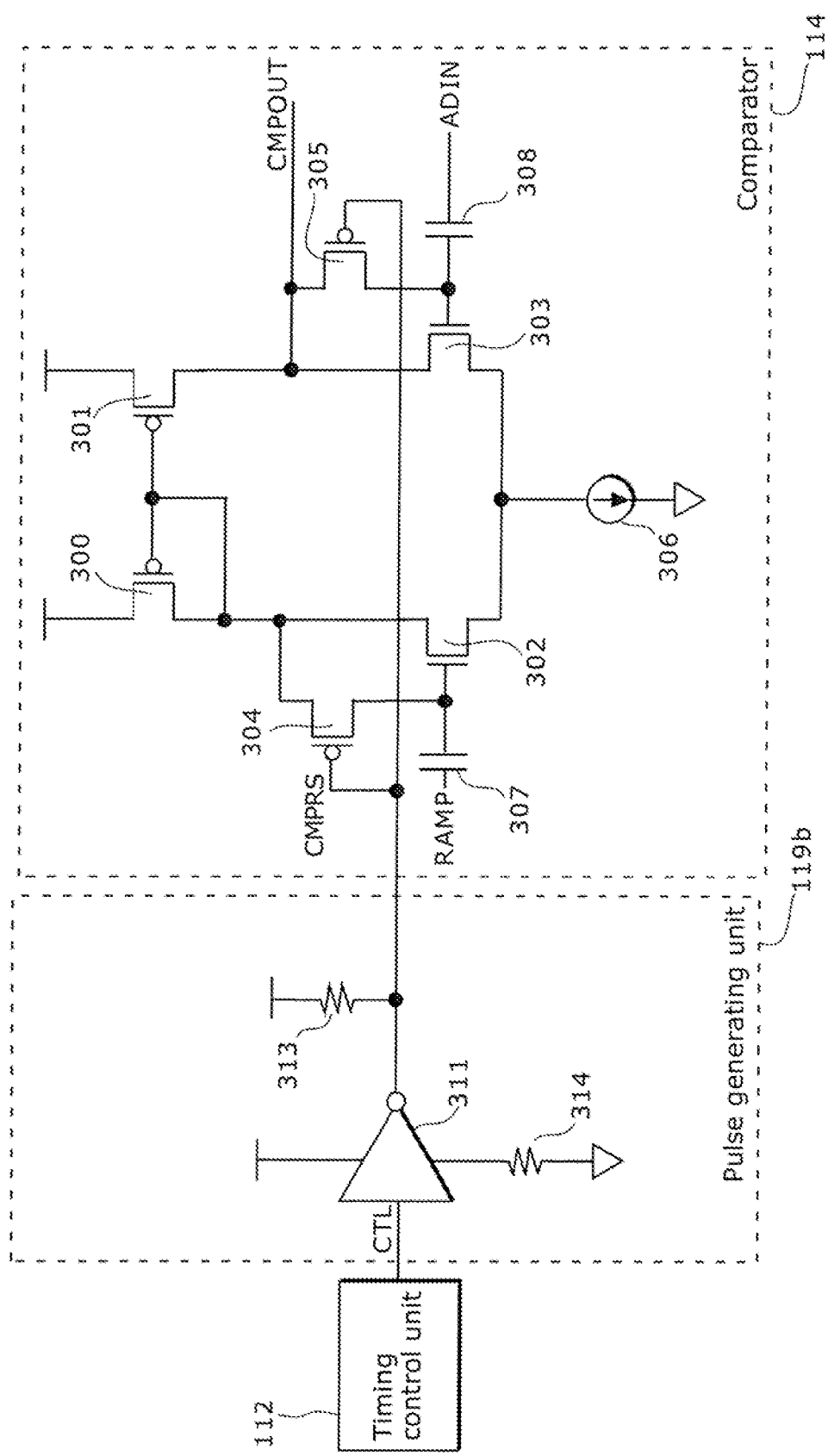
FIG. 14 is a circuit diagram illustrating a configuration of a pulse generating unit and a configuration of a comparator according to another example of the second comparative example of Embodiment 1.

Now, a description is given of the circuit configurations illustrated in FIGS. 13 and 14 as a second comparative example of Embodiment 1. In the circuit configurations in FIGS. 13 and 14, pulse generating units 119a and 119b instead of the logic swing and delay adjusting circuit 120 are disposed between the timing control unit 112 and the comparators 114 so that the logic swing of a reset signal generated by the timing control unit 112 is reduced. FIG. 13 is a circuit diagram illustrating a portion of a configuration of a solid-state imaging device including the pulse generating unit 119a instead of the logic swing and delay adjusting circuit 120, as an example of the second comparative example of Embodiment 1. FIG. 14 is a circuit diagram Illustrating a portion of a configuration of a solid-state imaging device including the pulse generating unit 119b instead of the logic swing and delay adjusting circuit 120, as another example of the second comparative example of Embodiment 1.

The pulse generating unit 119a in FIG. 13 according to an example of the second comparative example includes transistors 309 and 310 each of which is a diode-connected transistor, an inverter 311, and a current supply 312. The load transistor 300 and the transistor 309 have the same characteristics, and the reset transistor 304 and the transistor 310 have the same characteristics. The current supply 312 is set to have a current value half the current supply 306. The pulse generating unit 119a is required to generate a reset signal which achieves minimum L level necessary to turn on the reset transistors 304 and 305 while compensating process, power supply voltage and temperature (PVT) variations. Hence, there is a limitation on reducing logic swing VA.

The pulse generating unit 119b in FIG. 14 according to another example of the second comparative example includes resistors 313 and 314 and the inverter 311. The reset signal needs to have an amplitude to reliably turn on and off the reset transistors 304 and 305, and thus, there is a limitation on reducing logic swing VA. Accordingly, the time required for AD conversion cannot be sufficiently reduced.

As described, the solid-state imaging device according to the second comparative example including the pulse generating unit 119a or 119b instead of the logic swing and delay adjusting circuit 120 cannot sufficiently reduce the time required for AD conversion.

In contrast to the second comparative example, the solid-state imaging device 100 according to Embodiment 1 includes the logic swing and delay adjusting circuit 120 including: the CMOS logic circuit unit 121 which provides a reset signal to the comparators 114 at the time of auto zero; the resistors 128 to 130; and the switch transistors 126 and 127. The logic swing and delay adjusting circuit 120 adjusts the logic swing and the delay time of the reset signal generated by the timing control unit 112, which leads to a high-performance solid-state imaging device 100 which provides a high frame rate and which is not easily influenced by the digital noise.

Moreover, in the solid-state imaging device 100 according to Embodiment 1, it is possible to minimize leakage of the digital noise to the comparators 114 at the time of comparison by the comparators 114, that is, when the reset transistors 304 and 305 are off. Specifically, it is possible to minimize leakage of the power supply digital noise, generated by the timing control unit 112, the pulse generating units 119a and 119b and the like, to the input terminals or the output terminals of the comparators 114 via the gate-source capacitance Cgs or the gate-drain capacitance Cgd of each of the PMOS transistor and the reset transistors 304 and 305 in the CMOS inverter.

Moreover, with respect to the transistor size or current value, the CMOS logic circuit unit 121 in the solid-state imaging device 100 according to Embodiment 1 obtains practical driving ability substantially equal to that of the pulse generating unit 119a and 119b according to the second comparative example. Additionally, the CMOS logic circuit unit 121 reduces the circuit area and power consumption.

As described above, the solid-state imaging device 100 according to Embodiment 1 includes: the pixel unit 140 which includes the pixels 102 arranged in rows and columns and generates a pixel signal (Vsig) according to the amount of incident light; the column ADC 108 which is disposed for each of the columns of the pixel unit 140 and which performs digital conversion on the pixel signal (Vsig) output from the pixels 102 in the column; the timing control unit 112 which generates a reset signal for controlling the digital conversion performed by the column ADC 108; and the logic swing and delay adjusting circuit 120 which is disposed in a signal path for supplying the reset signal from the timing control unit 112 to the column ADC 108 and which reduces an amplitude of the reset signal and delays the reset signal.

With this, the solid-state imaging device 100 can control the respective column ADCs 108 by a reset signal approximately simultaneously. In other words, the respective AD converting units perform AD conversion approximately simultaneously. Accordingly, compared with the case where the column ADCs 108 in different columns operate at different times, the time required for AD conversion can be reduced, thereby providing a high frame rate.

Moreover, the solid-state imaging device 100 further includes the reference signal generating unit 111 which generates a ramp signal (Vslope) having a voltage value which varies along a slope. The column ADC 108 includes: the comparator 114 which compares the pixel signal (Vsig)

with the ramp signal (Vslope); and the counter unit 115 which counts a time period taken by the output of the comparator 114 to be inverted by a change in magnitude relationship between the pixel signal (Vsig) and the ramp signal (Vslope). The reset signal is a signal for executing auto zero of the comparator 114.

With this, the voltage offset generated at the time of auto zero of each comparator 114 can be efficiently reduced, which allows significant reduction in output variation of the comparator 114. As a result, the down count can be set small, which allows significant reduction in AD conversion time. In other words, the voltage offset generated by the comparator 114 in each column can be set approximately the same, which eliminates the need for processing for absorbing the voltage offset. Specifically, making the variation in voltage offset approximately the same eliminates the need for the down count required for absorbing the variation in count value when the respective columns have different down count values. As a result, the time required for AD conversion can be reduced, which provides a high frame rate.

Moreover, the logic swing and delay adjusting circuit 120 in the solid-state imaging device 100 according to Embodiment 1 includes: the CMOS logic circuit unit 121 which outputs a signal of high level or low level according to a voltage of the reset signal generated by the timing control unit 12; and the resistor 128 having: the first terminal connected to an output terminal of the CMOS logic circuit 121; and the second terminal electrically connected to the column ADC 108.

With this, it is also possible to increase digital noise resistance without significantly increasing the circuit area and the power consumption of the solid-state imaging device 100. In other words, it is possible to reduce the influence of the digital noise exerted on the column ADC 108 and accurately perform AD conversion.

Moreover, the logic swing and delay adjusting circuit 120 includes: the resistor 129; the switch transistor 126 connected in series to the resistor 129; the resistor 130; and the switch transistor 127 connected in series to the resistor 130. The resistor 129 and the switch transistor 126 are connected between a power supply and the second terminal of the resistor 128. The resistor 130 and the switch transistor 127 are connected between a ground and the second terminal of the resistor 128. When the CMOS logic circuit unit 121 outputs a signal of L level, the switch transistor 126 is on, and when the CMOS logic circuit unit 121 outputs a signal of H level, the switch transistor 126 is off. When the CMOS logic circuit unit 121 outputs a signal of H level, the switch transistor 127 is on, and when the CMOS logic circuit unit 121 outputs a signal of L level, the switch transistor 127 is off. With this, the voltage of H level of the reset signal can be reduced, and the voltage of L level of the reset signal can be increased. In other words, compared with the case where only one of the voltage of H level or L level is controlled, the amplitude of the reset signal can be reduced. Specifically, it is possible to reduce the time required for AD conversion.

Figure 15A:
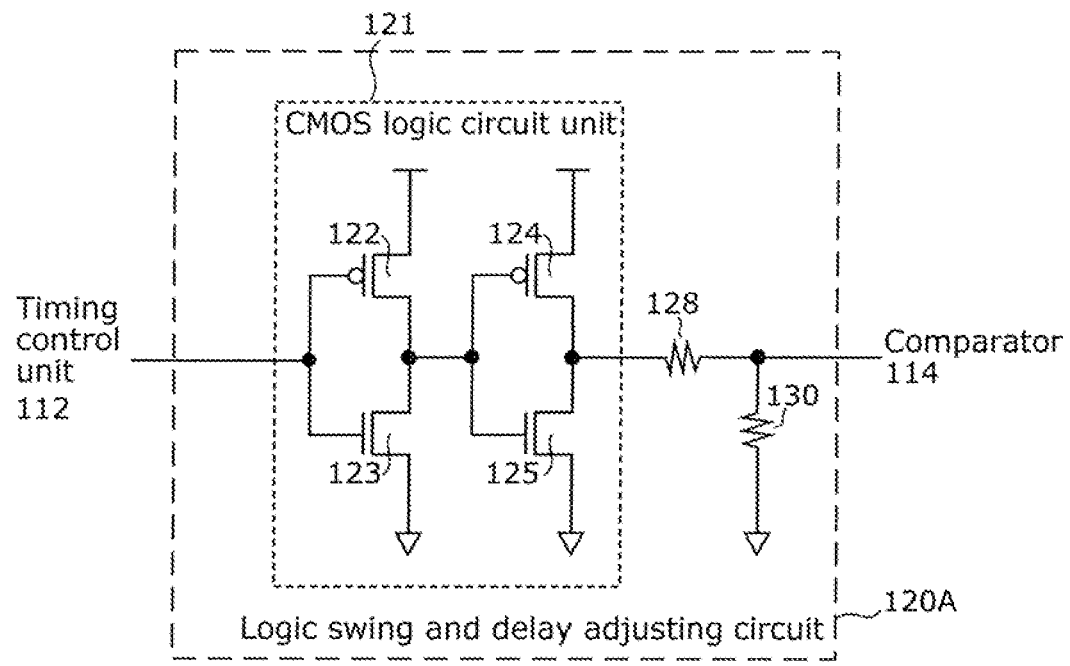
FIG. 15A is a circuit diagram illustrating another example of a configuration of a logic swing and delay adjusting circuit according to Embodiment 1.
Figure 15B:
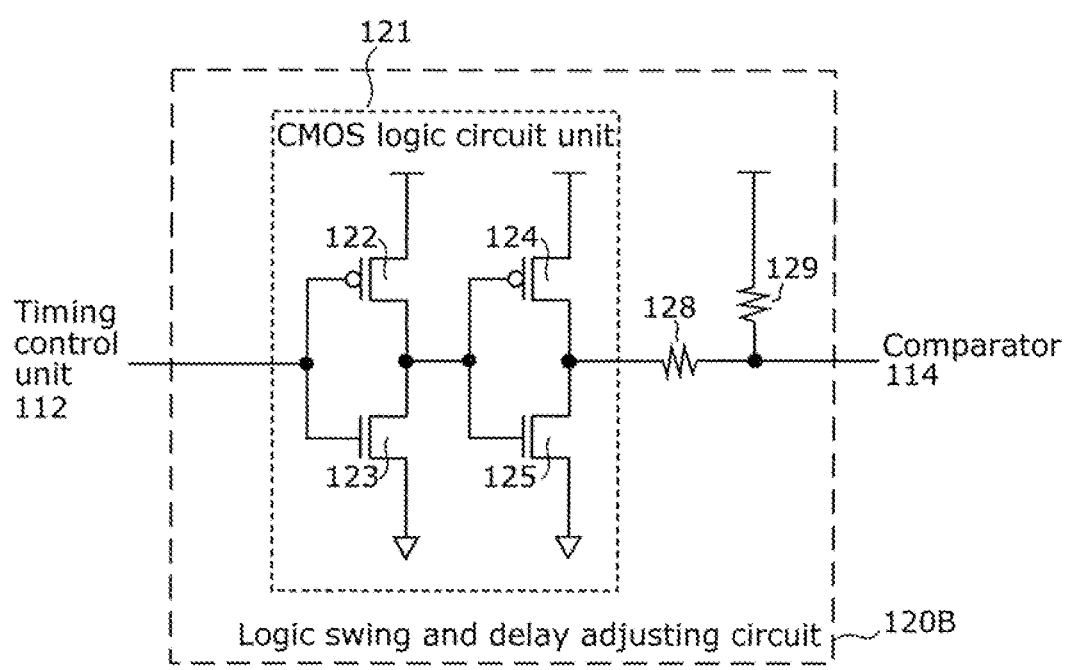
FIG. 15B is a circuit diagram illustrating another example of a configuration of a logic swing and delay adjusting circuit according to Embodiment 1.

In Embodiment 1, in order to control the logic swing by controlling both the H level and L level of the reset signal, the logic swing and delay adjusting circuit 120 is configured such that the output of the CMOS logic circuit unit 121 is connected to three resistors 128 to 130 and two switch transistors 126 and 127 as illustrated in FIG. 8. However, the logic swing and delay adjusting circuit may be configured differently from the above example. Specifically, the logic swing may be controlled by controlling only one of H level or L level of the reset signal. When only one of H level or L level is controlled, the switch transistors 126 and 127 are unnecessary, and the configuration as illustrated in FIG. 15A and FIG. 15B may be adopted. A logic swing and delay adjusting circuit 120A illustrated in FIG. 15A controls only voltage of H level of the reset signal, whereas a logic swing and delay adjusting circuit 120B illustrated in FIG. 15B controls only voltage of L level of the reset signal.

Moreover, in Embodiment 1, the CMOS logic circuit unit 121 is a two-stage CMOS inverter. However, the present disclosure is not limited to the example, and the CMOS logic circuit unit 121 may be any logic circuit.

In Embodiment 1, the resistors 128, 129, and 130 are fixed resistors, but it may be that at least one of the resistors is a variable resistor so that the logic swing and the delay time can be controlled.

In other words, the resistor 128 may be a variable resistor. Accordingly, the delay time can be adjusted, for example, in such a manner that the delay time increases when the resistance value of the resistor 128 is increased and the delay time is reduced when the resistance value of the resistor 128 is reduced. In other words, the resistor 129 may be a variable resistor. Accordingly, the voltage of H level of the reset signal can be reduced to the maximum extent. As a result, the time required for AD conversion can be further reduced, and a higher frame rate can be provided. For example, the voltage of H level of the reset signal can be reduced without impairing the operation of the column ADC 108 by reducing the voltage of H level of the reset signal while checking the operation of the column ADC 108. Moreover, the resistor 130 may be a variable resistor. Accordingly, the voltage of L level of the reset signal can be increased to the maximum extent without impairing the operation of the column ADC 108. As a result, the time required for AD conversion can be further reduced and a higher frame rate can be provided. For example, the voltage of L level of the reset signal can be increased without impairing the operation of the column ADC 108 by increasing the voltage of L level of the reset signal while checking the operation of the column ADC 108. The resistors 128, 129, and 130 according to Embodiment 1 are respectively an example of the first resistor, the second resistor, and the third resistor of the solid-state imaging device according to the present disclosure.

Figure 16:
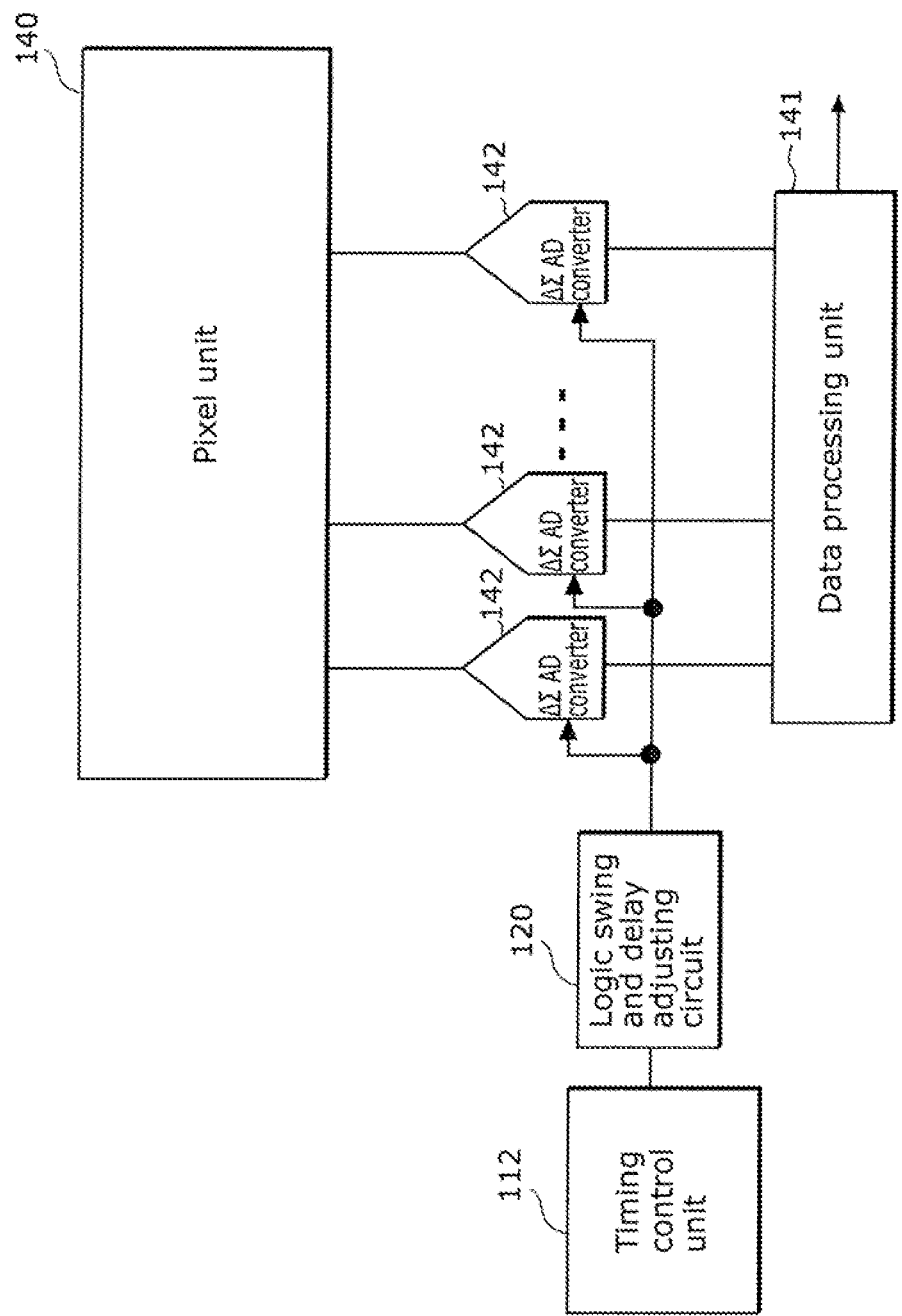
FIG. 16 is a block diagram illustrating an example of a configuration of a solid-state imaging device including ΔΣ AD converters which receive the output of the logic swing and delay adjusting circuit according to Embodiment 1 as a control clock.

In Embodiment 1, a signal having a logic swing and a delay time adjusted by the logic swing and delay adjusting circuit 120 is used as a reset signal for the comparator 114 in the solid-state imaging device 100 of a single slope AD conversion type. However, the present disclosure is not limited to the example. For example, the above adjusted signal may be used as a control clock signal φ for a sample and hold circuit 118A (for example, FIG. 17), in the solid-state imaging device including ΔΣ AD converters 142 as illustrated in FIG. 16 or control clock signals φ1 and φ2 for an integrator 118B (for example, FIG. 18) including a switched capacitor.

Figure 17:
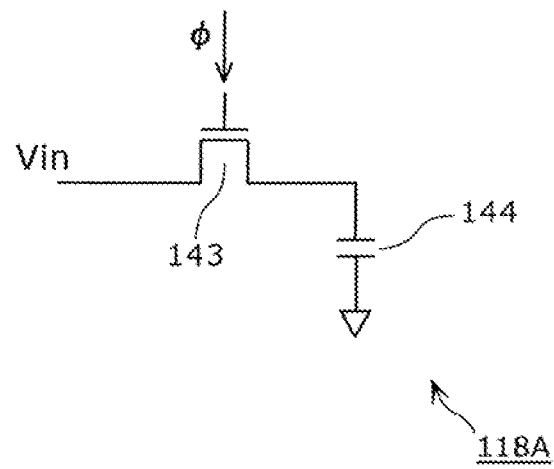
FIG. 17 is a circuit diagram illustrating an example of a configuration of a sample and hold circuit which receives the output of the logic swing and delay adjusting circuit according to Embodiment 1 as a control clock.
Figure 18:
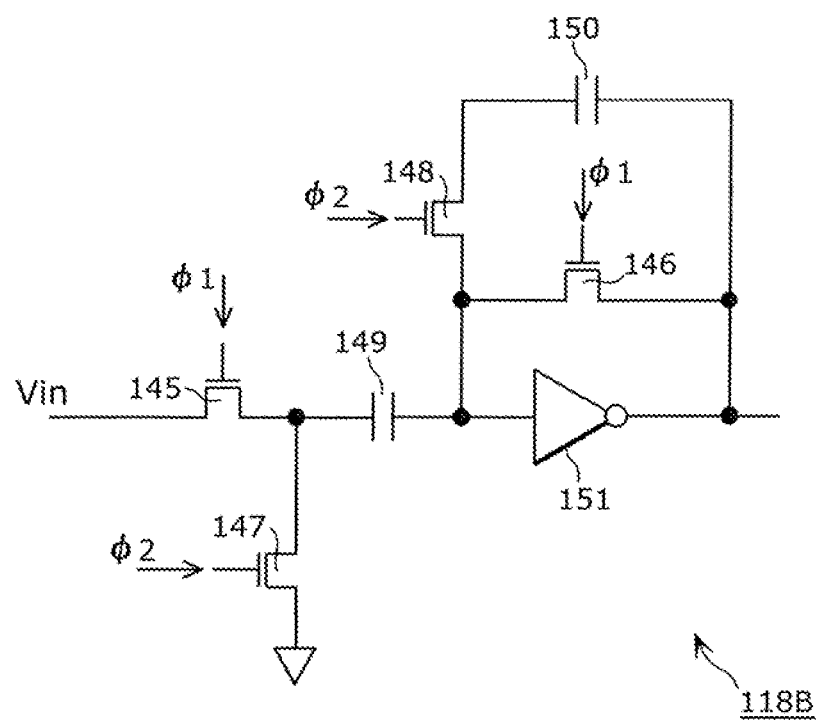
FIG. 18 is a circuit diagram illustrating an example of a configuration of an integrator including a switched capacitor circuit which receives the output of the logic swing and delay adjusting circuit according to Embodiment 1 as a control clock.

FIG. 17 is a circuit diagram illustrating an example of the sample and hold circuit. In the sample and hold circuit 118A, a switch 143 which turns on and off according to the control clock signal φ output from the logic swing and delay adjusting circuit 120 causes a capacitor 144 to hold input voltage Vin. FIG. 18 is a circuit diagram illustrating an example of a configuration of the integrator 118B including a switched capacitor circuit. The integrator 118B includes: a first switched capacitor circuit including an inverter 151, switches 145 and 147 disposed at the input of the inverter 151, and a capacitor 149; and a second switched capacitor including switches 146 and 148 and a capacitor 150 disposed in the feedback group of the inverter 151. The switches 145 and 146 turn on and off according to the control clock signal ϕ1 of the two-phase control clock signals ϕ1 and ϕ2 output from the logic swing and delay adjusting circuit 120. The switches 147 and 148 turn on and off according to the control clock signal ϕ2 of the two-phase control clock signals ϕ1 and ϕ2.

As described above, since the signal having a logic swing and a delay time adjusted by the logic swing and delay adjusting circuit 120 is used as a control clock for the ΔΣAD converter 142, the respective ΔΣ AD converter 142 in different columns can be controlled approximately simultaneously even at a high frame rate. Hence, the timing of the control clock in different columns does not vary, leading to reduction in false operation.

(Embodiment 2)

A solid-state imaging device according to Embodiment 2 is approximately the same as the solid-state imaging device 100 according to Embodiment 1, but is different in configuration of the logic swing and delay adjusting circuit. Hereinafter, referring to the drawings, a configuration and an operation of the solid-state imaging device according to Embodiment 2 will be described by mainly describing the differences from Embodiment 1.

Figure 19:
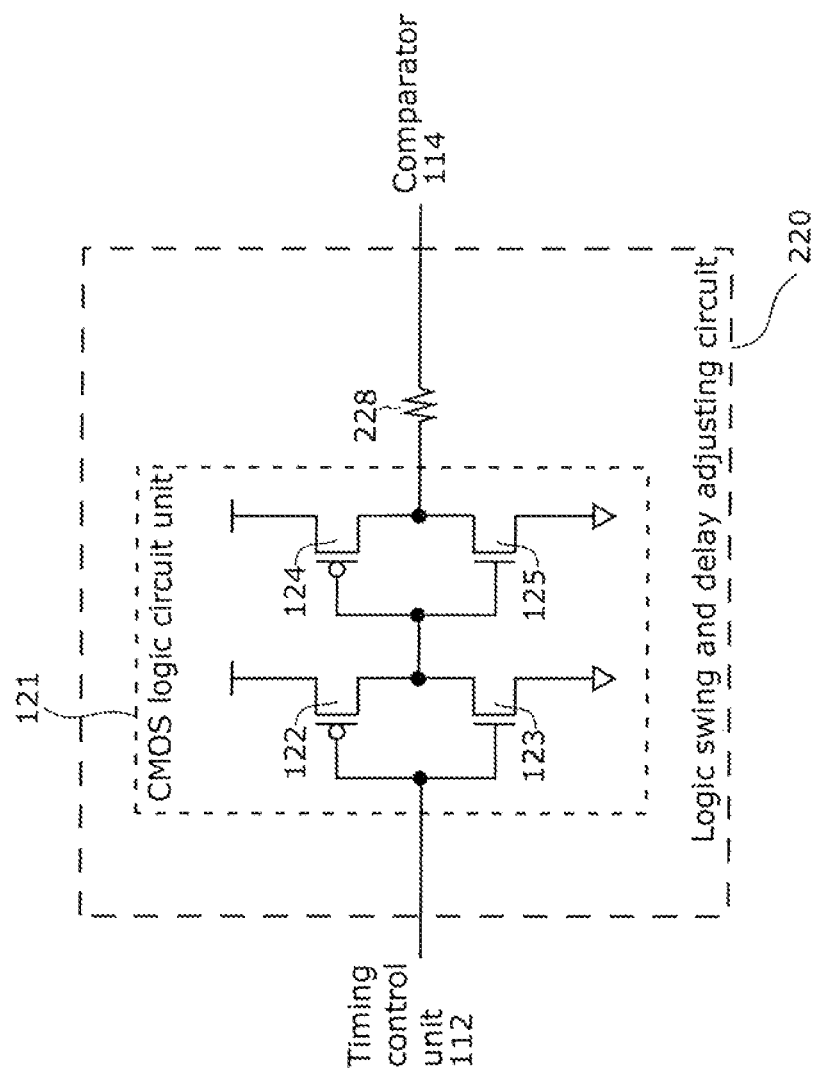
FIG. 19 is a circuit diagram illustrating an example of a configuration of a logic swing and delay adjusting circuit in a solid-state imaging device according to Embodiment 2.

FIG. 19 is a circuit diagram illustrating an example of a configuration of a logic swing and delay adjusting circuit in the solid-state imaging device according to Embodiment 2.

A logic swing and delay adjusting circuit 220 illustrated in FIG. 19 includes: the CMOS logic circuit unit 121 of a two-stage inverter including the transistors 122, 123, 124, and 125; and a resistor 228 having a resistance value greater than or equal to twice the parasitic resistance value of a rest signal line connecting the logic swing and delay adjusting circuit 220 and the comparators 114. In other words, the logic swing and delay adjusting circuit 220 illustrated in FIG. 19 is different from the logic swing and delay adjusting circuit 120 according to Embodiment 1 in that the resistor 228 is included instead of the resistors 128 to 130 and the switch transistors 126 and 127. In other words, the logic swing and delay adjusting circuit 220 includes: the CMOS logic circuit unit 121 which outputs a signal of H level or L level according to the voltage of a reset signal generated by the timing control unit 112; and the resistor 228 having a first terminal connected to the output terminal of the CMOS logic circuit unit 121 and a second terminal electrically connected to the column ADC 108. The resistor 228 has a resistance value greater than or equal to twice the resistance value of a line connecting the logic swing and delay adjusting circuit 220 and the column ADC 108 located farthest from the logic swing and delay adjusting circuit 220. The resistor 228 is another example of the first resistor according to the present disclosure.

The following describes the reason why it is appropriate that the resistance value R228 of the resistor 228 is greater than or equal to twice the parasitic resistance.

FIG. 20 illustrates a simplified model of FIG. 10, and is a circuit diagram schematically illustrating the parasitic elements generated in the line from the timing control unit 112 to the respective comparators 114. A signal source 331 and a resistor 328 are replacement of the timing control unit 112 and the logic swing and delay adjusting circuit 220 respectively in the equivalent circuit. A resistor 333 and a capacitor 334 are approximation of the reset signal line of the comparators 114 in 2000 columns. A capacitor 332 is a parasitic capacitance of the reset signal line connecting the logic swing and delay adjusting circuit 220 and the left-end comparator 114-1.

When a step signal as illustrated in FIG. 21 which changes from 0 V to 1 V at t=0 is input from the signal source 331 in FIG. 20, transient responses of voltage Vleft of the reset terminal of the left-end comparator 114-1 and voltage Vright of the reset terminal of the right-end comparator 114-2000 are respectively given by (Equation 4) and (Equation 5) below.

[Math. 4]

$$Vright = \left(\frac{\gamma 2}{\gamma 1 - \gamma 2}\right)e^{\gamma 1 t} - \left(\frac{\gamma 1}{\gamma 1 - \gamma 2}\right)e^{\gamma 2 t} \quad \text{(Equation 4)}$$

[Math. 5]

$$Vleft = \left\{C334 R333\left(\frac{\gamma 1 \gamma 2}{\gamma 1 - \gamma 2}\right) + \left(\frac{\gamma 2}{\gamma 1 - \gamma 2}\right)\right\}e^{\gamma 1 t} - \left\{C334 R333\left(\frac{\gamma 1 \gamma 2}{\gamma 1 - \gamma 2}\right) + \left(\frac{\gamma 1}{\gamma 1 - \gamma 2}\right)\right\}e^{\gamma 2 t} \quad \text{(Equation 5)}$$

where $$\gamma 1 = \left\{\frac{-(C332 R328 + C334 R328 + C334 R333) + \sqrt{(C332 R328 + C334 R328 + C334 R333)^2 - 4 C332 C334 R328 R333}}{2 C332 C334 R328 R333}\right\}$$

$$\gamma 2 = \left\{\frac{-(C332 R328 + C334 R328 + C334 R333) - \sqrt{(C332 R328 + C334 R328 + C334 R333)^2 - 4 C332 C334 R328 R333}}{2 C332 C334 R328 R333}\right\}$$

Here, γ1 and γ2 are always negative values.

Here, R328 and R333 are respectively the resistance values of the resistors 328 and 333, and C332 and C334 are respectively the capacitance values of the capacitors 332 and 334.

Figure 22A:
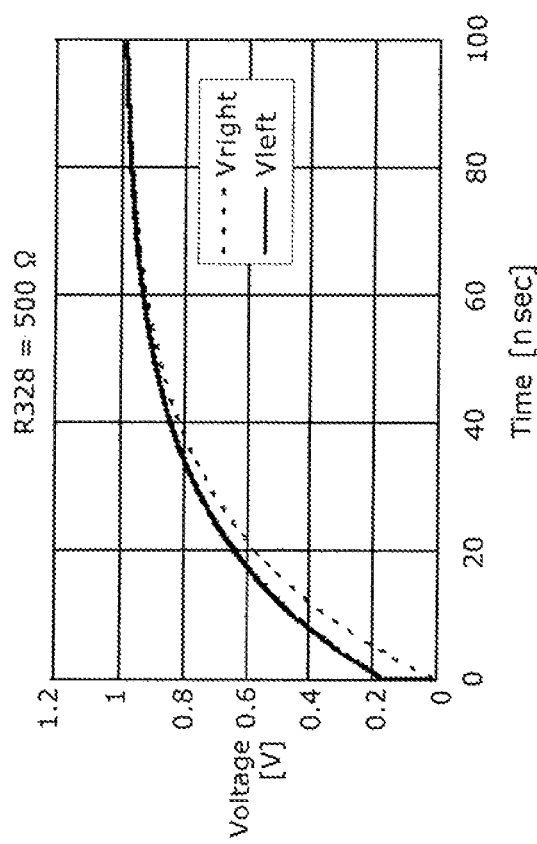
FIG. 22A is a graph of waveforms of Vleft and Vright at a resistance value of 50Ω in Embodiment 2.
Figure 22B:
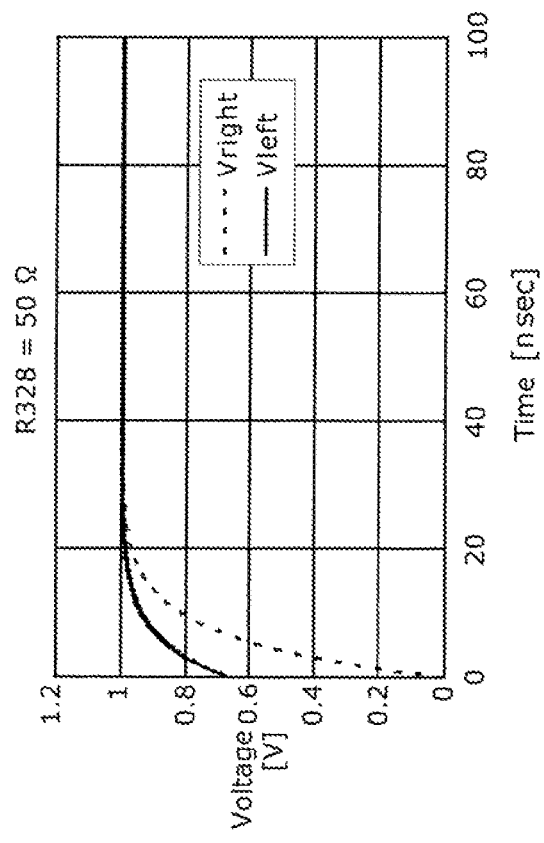
FIG. 22B is a graph of waveforms of Vleft and Vright at a resistance value of 500Ω in Embodiment 2.

For example, at C332=100 fF, R333=100Ω, and C334=40 pF, the waveforms of the Vleft and Vright obtained at R328=50Ω are as illustrated in FIG. 22A, and the waveforms of Vleft and Vright at R328=500Ω are as illustrated in FIG. 22B. From these diagrams, it is understood that the waveform of Vright is significantly different from that of Vleft at R328=50Ω, but the waveforms are approximately the same at R328=500Ω.

Figure 23:
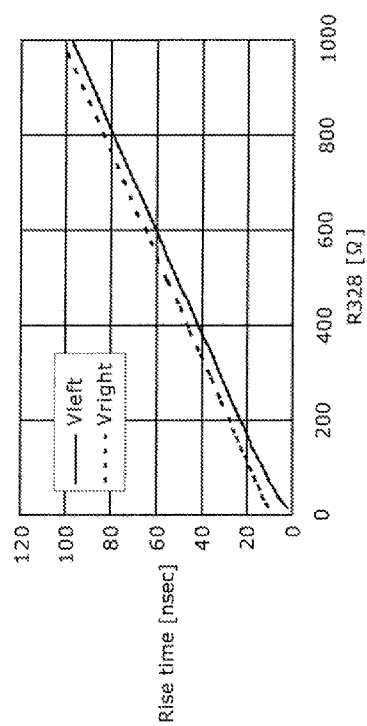
FIG. 23 is a graph of resistance value dependent characteristics of Vleft and Vright in Embodiment 2.

FIG. 23 is a graph indicating the dependence characteristics of R328 and rise time of Vleft and Vright. Note that the rise time here is defined as the time period during which a reset signal reaches 0.9 V. When R328 decreases, the rise time of both Vleft and Vright also decrease, but the ratio of Vleft and Vright increases. In contrast, when R328 increases, the rise times of both Vleft and Vright also increase, and ratio of Vleft and Vright approaches to 1.

Figure 24:
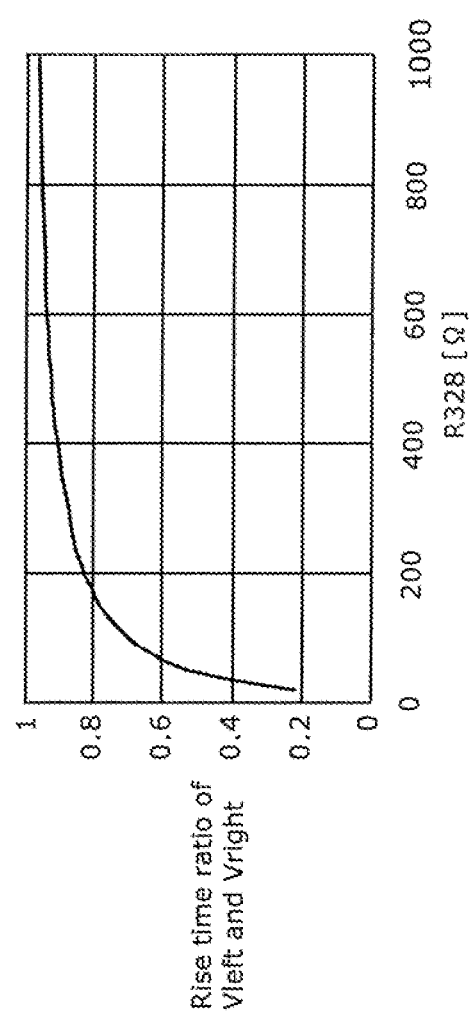
FIG. 24 is a graph of resistance value dependent properties of the rise time ratio of Vleft and Vright in Embodiment 2.

FIG. 24 is a graph indicating the dependence characteristics of R328 relative to the rise time ratio of Vleft and Vright. As illustrated in FIG. 24, R328 reaches the rise time ratio of 0.8 at 200Ω, approximately reaching saturation. Accordingly, it is appropriate to set R328 to be greater than or equal to twice the parasitic resistance R333 (=100Ω) of the reset signal line. Here, although detailed descriptions are not given, as long as a relation of C332<<C334 is satisfied regardless of the value of R333, the rise time ratio of Vleft and Vright is 0.8 at R328>2×R333, approximately reaching saturation without loss of generality.

In contrast, as FIG. 23 illustrates, excessive increase in R328 results in unnecessarily increase in rise time of the reset signal, which may influence the AD conversion time. Accordingly, it is desirable to design R328 to be approximately twice R333 in order to achieve a high frame rate.

In order to describe such effects, a solid-state imaging device including the comparators 114 in 2000 columns as illustrated in FIG. 10 will be described. For example, in the first half processing of CDS, when a pixel rest signal (Vrst) of the same level is input to ADIN1 to ADIN 2000 and the pixel reset signal is compared with the same ramp signal, the outputs of the voltages of the terminals of the CMPOUT 1 to CMPOUT 2000 are ideally inverted at the same time. However, due to the RC low-pass filters generated in the reset signal line in a distributed constant manner (FIG. 10 approximates 10 RC low-pass filters with an equal Interval and each having a resistance value of 10Ω and a capacitance value of 4 pF), the waveforms of the reset signal are gradually rounded from the left end comparator 114-1 to the right-end comparator 114-2000. Accordingly, each comparator 114 is influenced differently by the clock feedthrough or charge injection, which varies the output timing of the comparators 114.

Variation in output timing of the comparators 114 will be described with an example of a solid-state imaging device including no logic swing and delay adjusting circuit 220 as a comparative example of Embodiment 2.

Figure 25A:
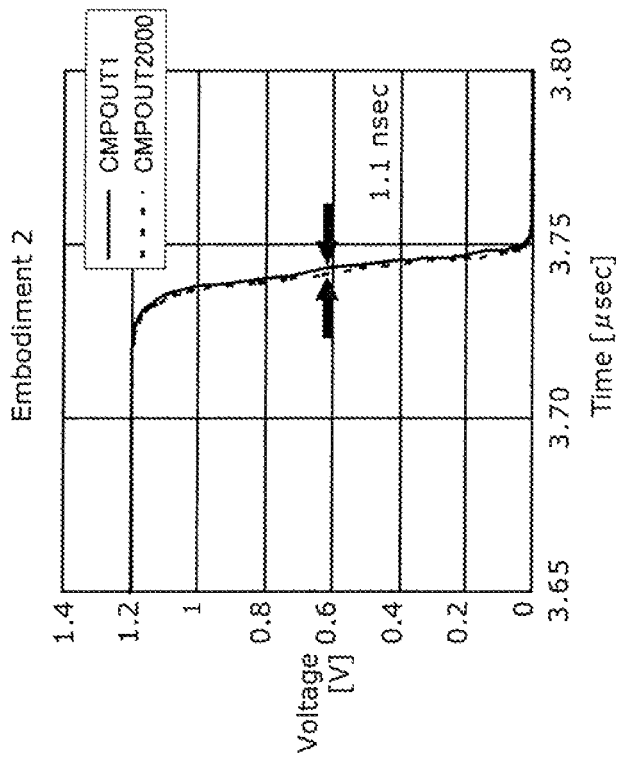
FIG. 25A is a graph of output waveforms of comparators according to a comparative example of Embodiment 2.
Figure 25B:
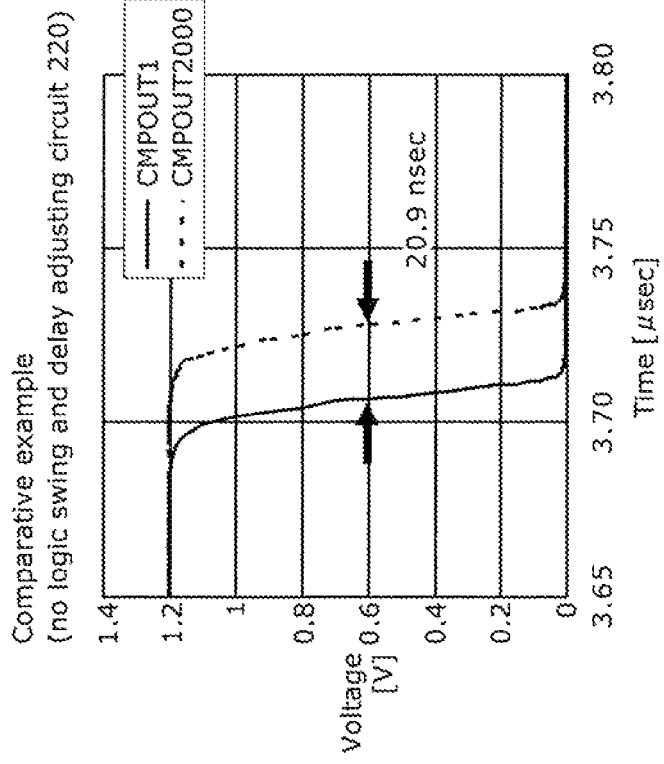
FIG. 25B is a graph of output waveforms of the comparators according to Embodiment 2.

FIG. 25A and FIG. 25B are graphs of the waveforms of the voltage of the CMPOUT 1 (the output terminal of the left-end comparator) and the voltage of the CMPOUT 2000 (the output terminal of the right-end comparator) at R228=200Ω. Specifically, FIG. 25A is a graph of the output waveforms of the comparators 114 in the solid-state imaging device including no logic swing and delay adjusting circuit 220 according to the comparative example of Embodiment 2. FIG. 25B is a graph of the output waveforms of the comparators 114 in the solid-state imaging device including the logic swing and delay adjusting circuit 220 according to Embodiment 2. More specifically, FIG. 25A and FIG. 25B are graphs of the output waveforms of the CMPOUT 1 (the output terminal of the left-end comparator 114-1) and the output waveforms of the CMPOUT 2000 (the output terminal of the right-end comparator 114-2000) in the solid-state imaging devices according the comparative example and Embodiment 2.

These graphs show that a variation of 20.9 nsec is present in the comparative example, whereas the variation in Embodiment 2 is reduced to 1.1 nsec which is ⅒ of that in the comparative example.

Such a reduction in output variation of the comparators 114 allows the down count to be set small, which leads to reduction in time required for AD conversion. Accordingly, in the similar manner to Embodiment 1, the amount of voltage offset generated by the clock feedthrough can be made almost the same in all of the column ADCs 108. As a result, it is possible to provide a high-performance solid-state imaging device which provides a high frame rate.

In a similar manner to Embodiment 1, in Embodiment 2, the digital noise coming to the comparators 114 via the reset signal line can also be suppressed.

As described in Embodiment 1, in general, since the comparator 114 is a circuit block which is easily influenced by digital noise, the comparator 114 is isolated from the power supply. Specifically, power from a digital power supply is provided to the timing control unit 112, and power from an analog power supply is provided to the comparator 114. Even when the comparator 114 is not isolated from the power supply, power is provided from the power supply to the comparator 114 by branching wires so as to avoid a common impedance to the maximum extent. Accordingly, it is possible to reduce propagation of the digital noise, caused by operation of the timing control unit 112, to the comparator 114 via the power supply. However, in the configuration of the comparative example including no logic swing and delay adjusting circuit 220, a digital power supply is connected to the comparators 114 via the reset signal line or a digital ground is directly connected with the comparator 114. Hence, the digital noise generated by the timing control unit 112 influences the comparator 114.

Figure 26:
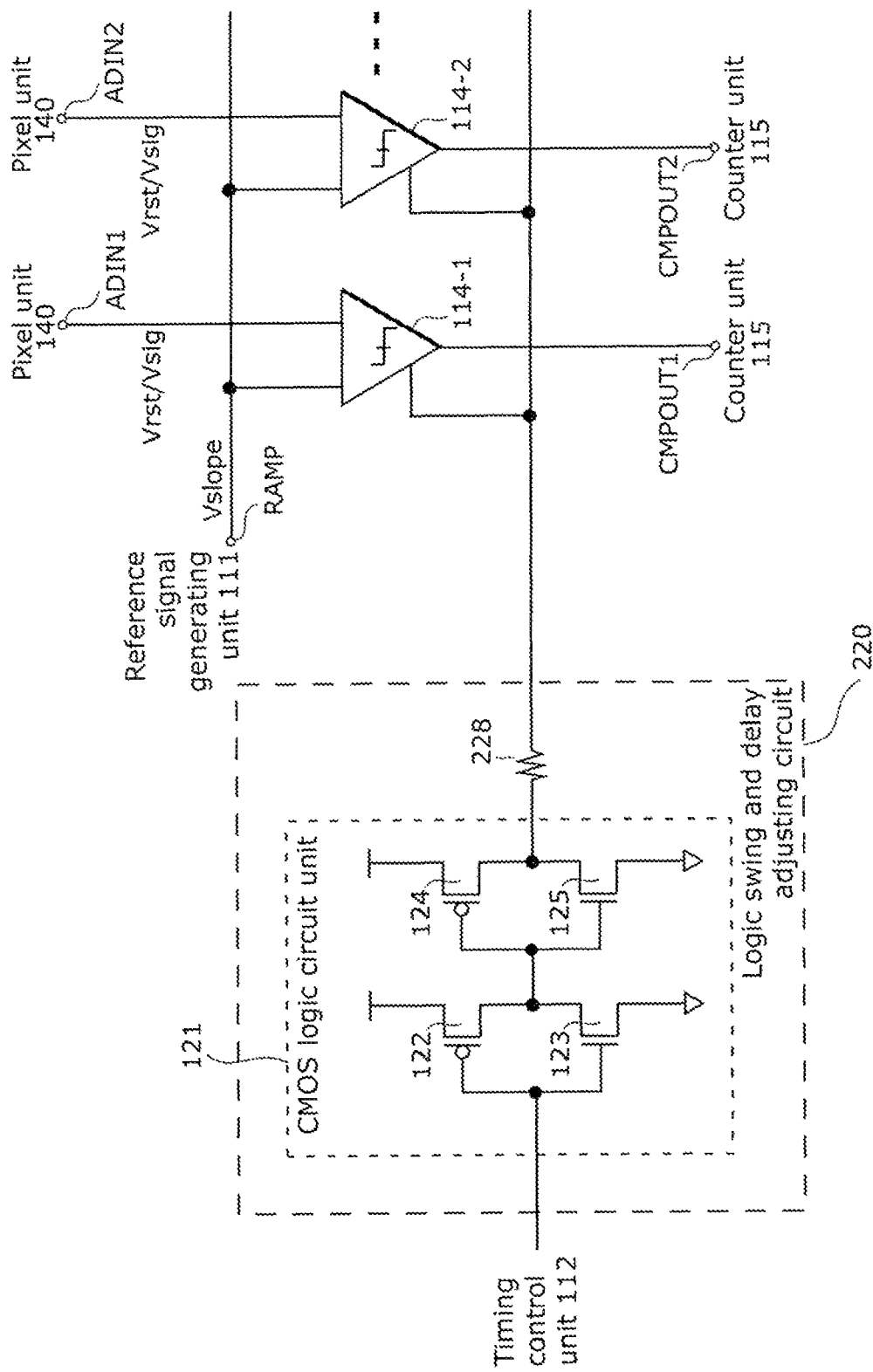
FIG. 26 is a graph for Illustrating increase in digital noise resistance in the solid-state imaging device according to Embodiment 2.

In contrast, in the solid-state imaging device according to Embodiment 2, as illustrated in FIG. 26, the resistor 228 connected between the comparator 114 and the digital power supply or the digital ground blocks the digital noise. This leads to a high-performance solid-state imaging device which is not easily influenced by the digital noise.

As described above, according to the solid-state imaging device in Embodiment 2 described above, the delay time of the reset signal provided to the comparators 114 at auto zero is adjusted by the logic swing and delay adjusting circuit 220 including the CMOS logic circuit unit 121 and the resistor. This leads to a high-performance solid-state imaging device which provides a high frame rate and which is not easily influenced by the digital noise. Specifically, it is possible to reliably make the time required for rise and fall of the reset signal in the column ACD 108 located closest to the logic swing and delay adjusting circuit 220 approximately equal to the time required for rise and fall of the reset signal in the column ADC 108 located farthest from the logic swing and delay adjusting circuit 220.

Moreover, in Embodiment 2, the CMOS logic circuit unit 121 is a two-stage CMOS inverter, but the present disclosure is not limited to the example, and the CMOS logic circuit unit 121 may be any logic circuit.

Moreover, in Embodiment 2, the resistor 228 is a fixed resistor, but may be a variable resistor so that the delay time can be adjusted.

Moreover, in Embodiment 2, the signal having a delay time adjusted by the logic swing and delay adjusting circuit 220 is used as the reset signal for the comparators 114 in the solid-state imaging device of a single slope AD conversion type. However, the present disclosure is not limited to the example. For example, the above adjusted signal may be used as a control clock signal for the sample and hold circuit 118A (for example, FIG. 17) or as a control clock signal for the integrator 118B (for example, FIG. 18) including a switched capacitor, in the solid-state imaging device illustrated in FIG. 16 including the ΔΣ AD converters 142.

Moreover, the logic swing and delay adjusting circuit 220 according to Embodiment 2 may further include the switch transistors 126 and 127, and the resistors 129 and 139 included in the logic swing and delay adjusting circuit 120 according to Embodiment 1.

(Embodiment 3)

A solid-state imaging device according to Embodiment 3 is approximately the same as the solid-state imaging device 100 according to Embodiment 1, but is different in configuration of the logic swing and delay adjusting circuit. Hereinafter, referring to the drawings, a configuration and an operation of the solid-state imaging device according to Embodiment 3 will be described by mainly describing the differences from Embodiment 1.

Figure 27:
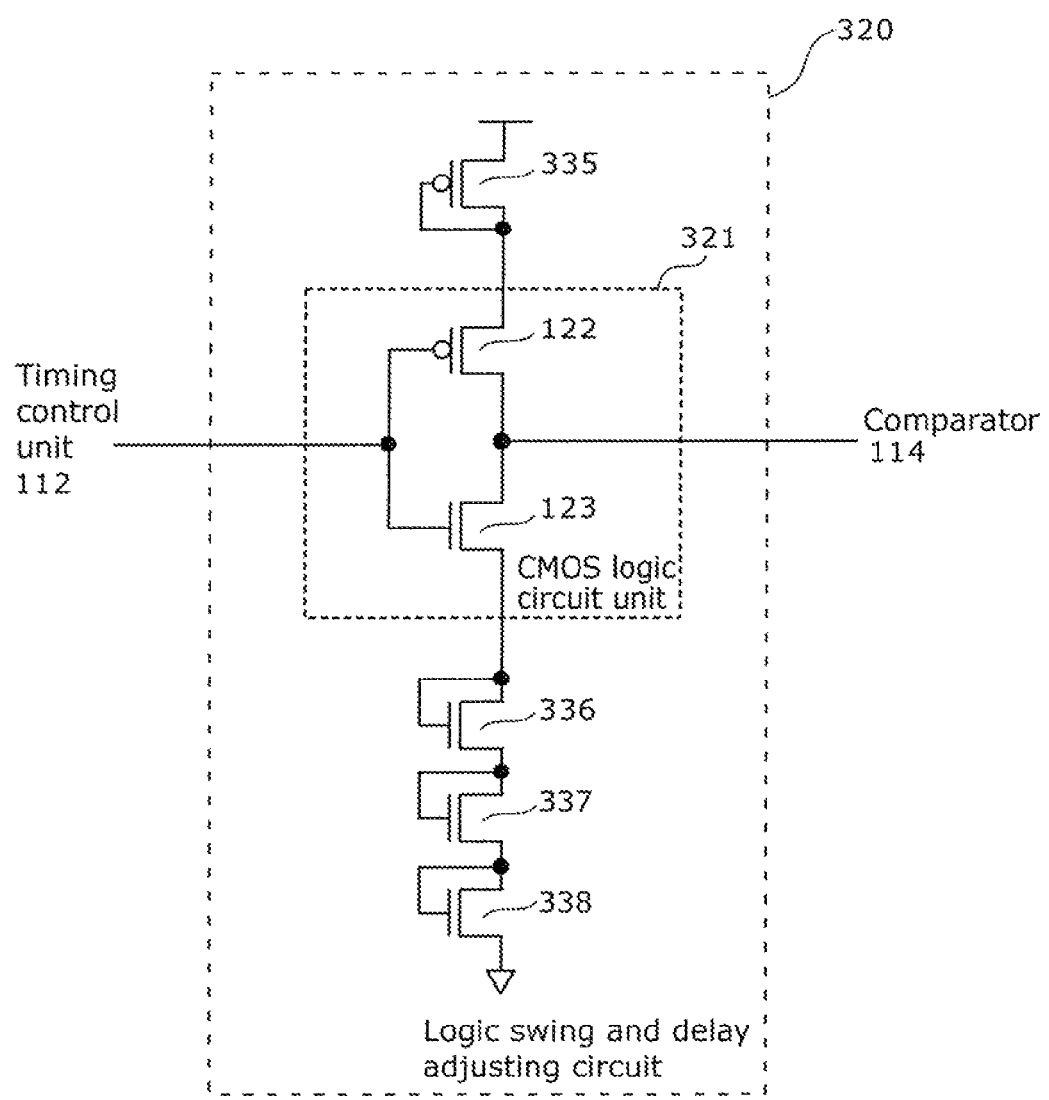
FIG. 27 is a circuit diagram illustrating an example of a configuration of a logic swing and delay adjusting circuit in a solid-state imaging device according to Embodiment 3.

FIG. 27 is a circuit diagram illustrating an example of a configuration of a logic swing and delay adjusting circuit in the solid-state imaging device according to Embodiment 3.

A logic swing and delay adjusting circuit 320 illustrated in FIG. 27 includes: a CMOS logic circuit unit 321 of an inverter including the transistors 122 and 123; a diode-connected PMOS transistor 335 connected to the power supply terminal of the CMOS logic circuit unit 321; and diode-connected NMOS transistors 336, 337, and 338 connected to the ground terminal. In other words, the logic swing and delay adjusting circuit 320 illustrated in FIG. 27 is different from the logic swing and delay adjusting circuit 120 according to Embodiment 1 in that the CMOS logic circuit unit 321 is included instead of the CMOS logic circuit unit 121 and that the PMOS transistor 335 connected to the power supply terminal of the CMOS logic circuit unit 321 and the NMOS transistors 336, 337, and 338 connected to the ground terminal of the CMOS logic circuit unit 321 are included instead of the resistors 128, 129, and 130 and the transistors 126 and 127.

Specifically, the logic swing and delay adjusting circuit 320 includes: the CMOS logic circuit unit 321 which has a power supply terminal and a ground terminal, receives a reset signal generated by the timing control unit 112, and outputs a signal of H level or L level according to the voltage of the reset signal; a one-stage PMOS transistor 335 disposed between the power supply terminal of the CMOS logic circuit unit 321 and the power supply; and three-stage NMOS transistors 336 to 338 disposed between the ground terminal of the CMOS logic circuit unit 321 and the ground and connected in series. The PMOS transistor 335 is a diode-connected transistor and each of the NMOS transistors 336 to 338 is a diode-connected transistor. The power supply terminal of the CMOS logic circuit unit 321 is an example of the first power supply terminal according to the present disclosure. The ground terminal of the CMOS logic circuit unit 321 is an example of the second power supply terminal according to the present disclosure.

Next, an operation of the logic swing and delay adjusting circuit 320 thus configured will be described.

In the logic swing and delay adjusting circuit 320 illustrated in FIG. 27, when a signal of H level (power supply voltage) is input, the transistor 123 is turned on and a signal of L level is output. When Vthn is a threshold voltage of the NMOS transistors 336, 337, and 338, voltage VL3 of L level output from the logic swing and delay adjusting circuit 320 is given by (Equation 6) below.

[Math. 6]

$$VL3 = 3 Vthn \quad \text{(Equation 6)}$$

On the other hand, when a signal of L level (0 V) is input from the timing control unit 112, the transistor 122 is turned on and a signal of H level is output. When VDD is a power supply voltage and Vthp is a threshold voltage of the PMOS transistor 335, voltage VH1 of H level output from the logic swing and delay adjusting circuit 320 is given by (Equation 7) below.

[Math. 7]

$$VH1 = VDD - Vthp \quad \text{(Equation 7)}$$

For example, at the power supply voltage of 3.3 V (VDD=3.3 V) and at Vthn=Vthp=0.5 V, VL3=1.5 V and VH1=2.8 V. When the comparator 114 is of an operating amplifier type as illustrated in FIG. 3, a reset signal can be set to an appropriate logic swing level.

On the other hand, at the time of release of reset (when VL3 is changed to VH1), current is provided from the PMOS transistor 335 having diode characteristics, leading to a gradual transition.

In this way, at the time of reset, that is, when a signal of H level is being input from the timing control unit 112 to the logic swing and delay adjusting circuit 320, the logic swing and delay adjusting circuit 320 is capable of outputting, to the comparator 114, voltage which reliably turns on the reset transistors 304 and 305 of the comparator 114. Moreover, at the time of reset, that is, when a signal of L level is being input from the timing control unit 112 to the logic swing and delay adjusting circuit 320, the logic swing and delay adjusting circuit 320 is capable of outputting, to the comparator 114, voltage which reliably turns off the reset transistors 304 and 305 of the comparator 114. Moreover, when the reset is released, that is, when the voltage input to the logic swing and delay adjusting circuit 320 from the timing control unit 112 is changed from H level to L level, the voltage output to the comparator 114 is changed gradually. In other words, a change is made by giving a delay time.

Figure 28:
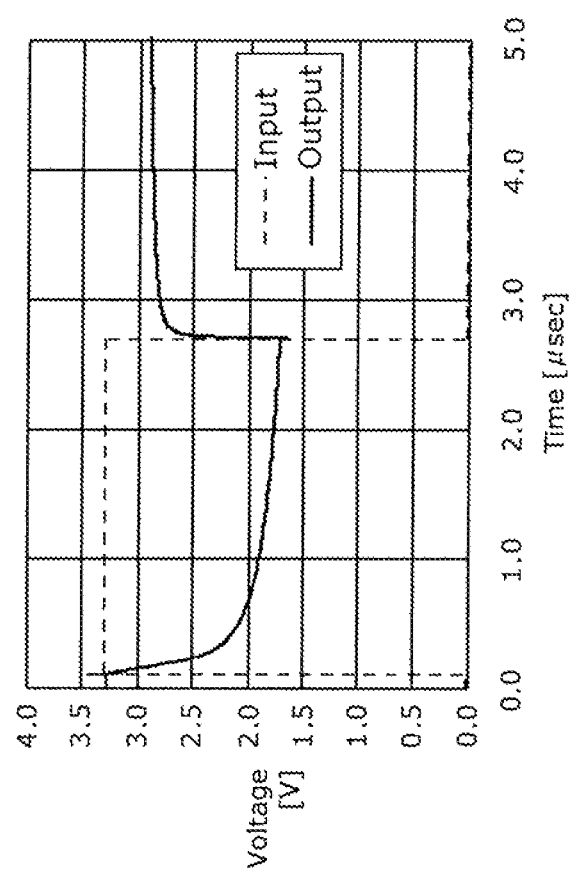
FIG. 28 is a graph of an input waveform and an output waveform of the logic swing and delay adjusting circuit according to Embodiment 3.

FIG. 28 is a graph of the input and output waveforms of the logic swing and delay adjusting circuit 320 illustrated in FIG. 27. As illustrated in FIG. 28, the logic swing and delay adjusting circuit 320 reduces the logic swing of the reset signal and also causes a delay time.

In order to describe such effects, a solid-state imaging device including the comparators 114 in 2000 columns as illustrated in FIG. 10 will be described. For example, when, in the first half processing of CDS, a pixel rest signal (Vrst) of the same level is input to the ADIN 1 to the ADIN 2000 and the pixel reset signal is compared with the same ramp signal (Vslope), the output from the CMPOUT 1 to the CMPOUT 2000 are ideally inverted at the same time.

However, in the solid-state imaging device according to the comparative example described below, that is, in the solid-state imaging device including no logic swing and delay adjusting circuit 320, due to the RC low-pass filters generated in the reset signal line in a distributed constant manner (FIG. 10 approximates 10 RC low-pass filters with an equal interval and each having a resistance value of 10Ω and a capacitance value of 4 pF), the waveform of the reset signal is gradually rounded from the left-end comparator 114-1 to the right-end comparator 114-2000. Accordingly, each comparator 114 is influenced differently by the clock feedthrough or charge injection, which varies the output timing of the comparators 114-1 to 114-2000.

Variation in output timing of the comparators 114 will be described with an example of a solid-state imaging device including no logic swing and delay adjusting circuit 320 as a comparative example of Embodiment 3.

Figure 29A:
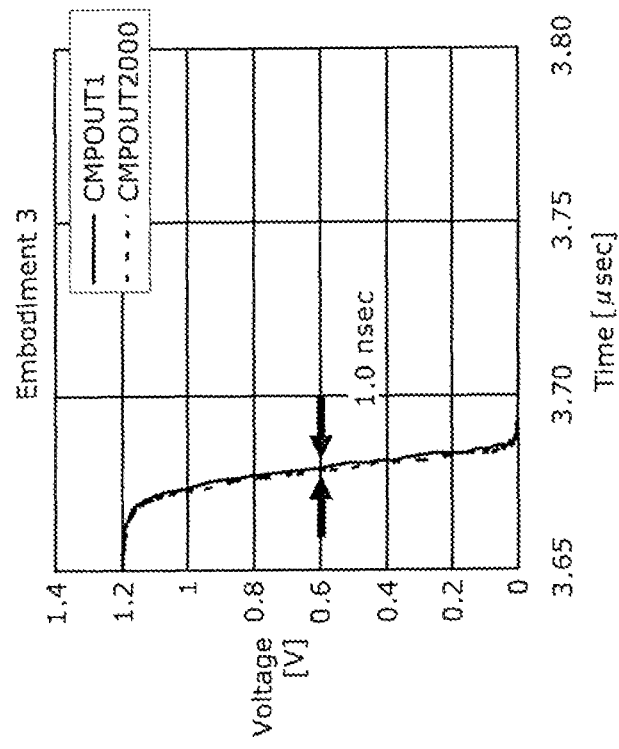
FIG. 29A is a graph of output waveforms of comparators according to a comparative example of Embodiment 3.
Figure 29B:
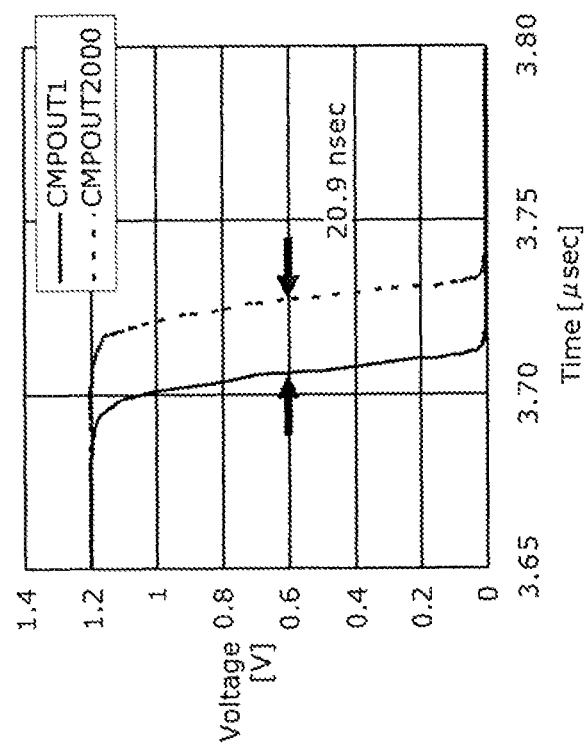
FIG. 29B is a graph of output waveforms of the comparators according to Embodiment 3.

FIG. 29A and FIG. 29B are graphs of the output waveforms of the CMPOUT 1 (the output terminal of the left-end comparator 114-1) and the output waveforms of the CMPOUT 2000 (the output terminal of the right-end comparator 114-2000). FIG. 29A illustrates the output waveform according to the comparative example of Embodiment 3 (no logic swing and delay adjusting circuit 320). FIG. 29B illustrates the output waveform obtained when the logic swing and delay adjusting circuit 320 according to Embodiment 3 is connected. These graphs show that in the comparative example, a variation of 20.9 nsec is present between the output waveform of the left-end comparator 114-1 and the output waveform of the comparator 114-2000. In contrast, in Embodiment 3, the variation is reduced to 1.0 nsec which is ⅟10 of that of the comparative example.

Such a reduced variation in output of the comparators 114 allows the down count to be set small, which leads to reduction in time required for AD conversion. As a result, it is possible to provide a high-performance solid-state imaging device which provides a high frame rate.

In a similar manner to Embodiment 1, in Embodiment 3, the digital noise coming to the comparators 114 via the reset signal line can also be suppressed.

In general, since the comparator 114 is a circuit block which is easily influenced by digital noise, the comparator 114 is isolated from the power supply. Specifically, power from a digital power supply is provided to the timing control unit 112, and power from an analog power supply is provided to the comparator 114. Even when the comparator 114 is not isolated from the power supply, power is provided from the power supply to the comparator 114 by branching wires so as to avoid a common impedance to the maximum extent. Accordingly, it is possible to reduce propagation of the digital noise, caused by operation of the timing control unit 112, to the comparator 114 via the power supply. However, in the configuration of the comparative example including no logic swing and delay adjusting circuit 320, since a digital power supply is connected to the comparators 114 via the reset signal line or a digital ground is directly connected with the comparator 114, the digital noise caused by the timing control unit 112 influences the comparator 114.

In contrast, in the solid-state imaging device according to Embodiment 3, as illustrated in FIG. 30, the diode-connected PMOS transistor 335 and the diode-connected NMOS transistors 336, 337, and 338 connected between the comparator 114 and the digital power supply or the digital ground block the digital noise. Hence, it is possible to provide a high-performance solid-state imaging device which is not easily influenced by the digital noise.

As described above, in the solid-state imaging device according to Embodiment 3, the logic swing and delay adjusting circuit 320 including: the CMOS logic circuit unit 321; the diode-connected PMOS transistor 335; and the diode-connected NMOS transistors 336, 337, and 338, adjusts the logic swing and the delay time of the reset signal provided to the comparator 114 at auto zero. This leads to a high-performance solid-state imaging device which provides a high frame rate and which is not easily influenced by digital noise.

In other words, the logic swing and delay adjusting circuit 320 in the solid-state imaging device according to Embodiment 3 includes: the CMOS logic circuit unit 321 which has a power supply terminal and a ground terminal, receives a reset signal generated by the timing control unit 112, and outputs a signal of H level or L level according to the voltage of the reset signal; one-stage PMOS transistor 335 disposed between the power supply terminal and the power supply; and three-stage NMOS transistors 336 to 338 disposed between the ground terminal and the ground and connected in series. Each of the PMOS transistor 335 and the NMOS transistors 336 to 338 is a diode-connected transistor.

Accordingly, in a similar manner to the solid-state imaging device 100 according to Embodiment 1, the solid-state imaging device according to Embodiment 3 is capable of adjusting the H level and the L level of the reset signal. Additionally, the PMOS transistor 335 reduces the influence of the digital noise coming from the power supply on the column ADC 108, and the NMOS transistors 336 to 338 reduce the influence of the digital noise coming from the ground on the column ADC 108. This lead to accurate AD conversion.

In Embodiment 3, in order to control the logic swing by controlling both H level and L level of the reset signal, in the logic swing and delay adjusting circuit 320 as illustrated in FIG. 27, one diode-connected PMOS transistor 335 is connected to the power supply terminal of the CMOS logic circuit unit 321, and three diode-connected NMOS transistors 336 to 338 are connected to the ground terminal. However, in order to control only one of H level or L level, it may be that one or more diode-connected transistors are connected to either the power supply terminal or the ground terminal.

Figure 31:
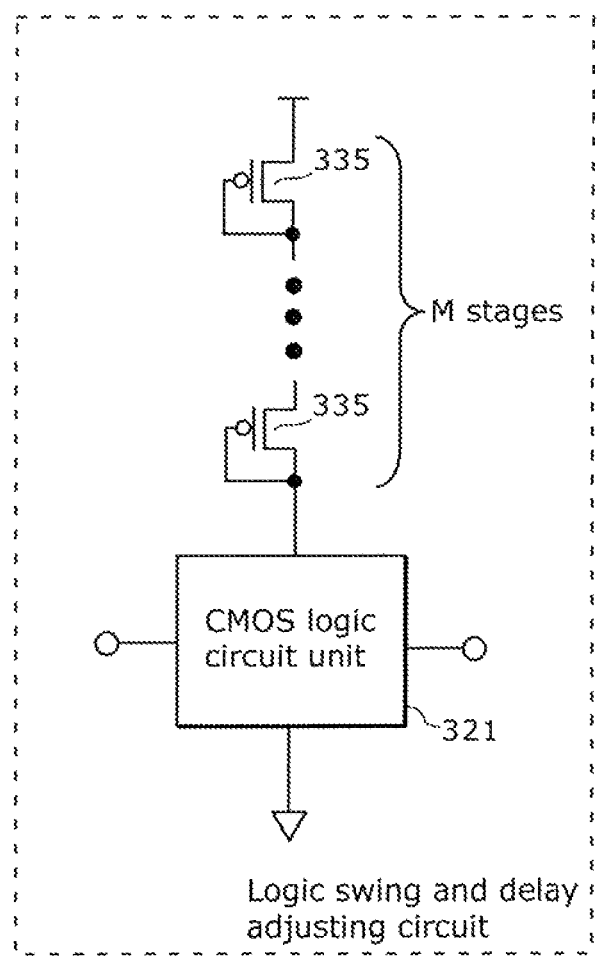
FIG. 31 is a circuit diagram illustrating an example of a configuration of the logic swing and delay adjusting circuit according to Embodiment 3.
Figure 32:
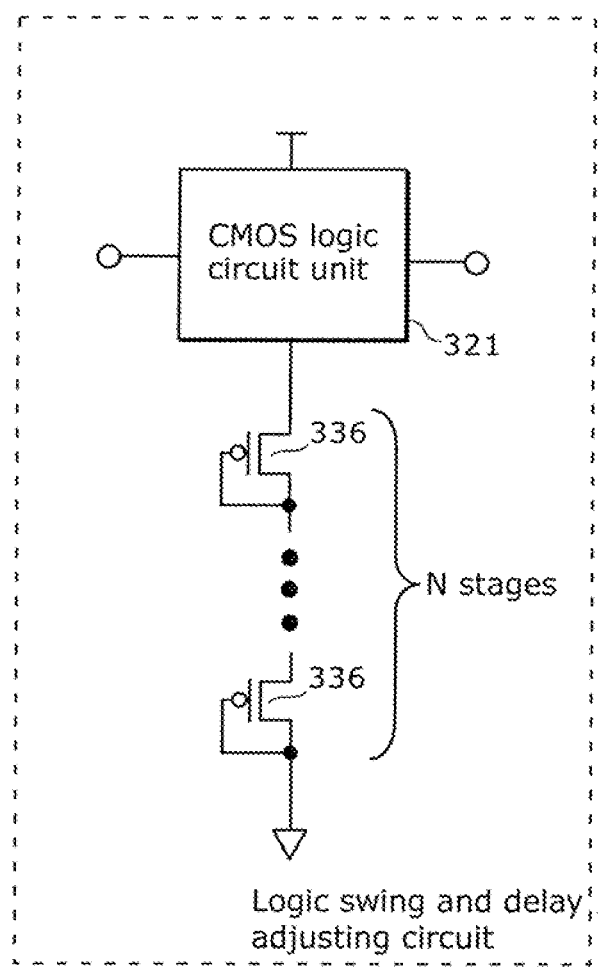
FIG. 32 is a circuit diagram illustrating another example of a configuration of the logic swing and delay adjusting circuit according to Embodiment 3.

The number of diode-connected PMOS transistors connected between the power supply and the power supply terminal of the CMOS logic circuit unit 321 is not limited to one, but may be M transistors (M is an integer of one or greater) as illustrated in FIG. 31. The number of steps of the diode-connected NMOS transistors connected between the ground and the ground terminal of the CMOS logic circuit unit 321 is not limited to three, but may be N (where N is an integer of one or greater) as illustrated in FIG. 32.

Moreover, in Embodiment 3 the CMOS logic circuit unit 321 is a CMOS inverter, but the present disclosure is not limited to the example and the CMOS logic circuit unit 321 may be any logic circuit.

Moreover, in Embodiment 3, the signal having a logic swing and a delay time adjusted by the logic swing and delay adjusting circuit 320 is used as a reset signal for the comparators in the solid-state imaging device of a single slope AD conversion type. However, the present disclosure is not limited to the example. For example, the above adjusted signal may be used as a control clock signal for the sample and hold circuit (for example, FIG. 17) in the solid-state imaging device illustrated in FIG. 16 including the ΔΣ AD converters 142 or as a control clock signal for the integrator 118B (for example, FIG. 18) including a switched capacitor.

(Embodiment 4)

Figure 33A:
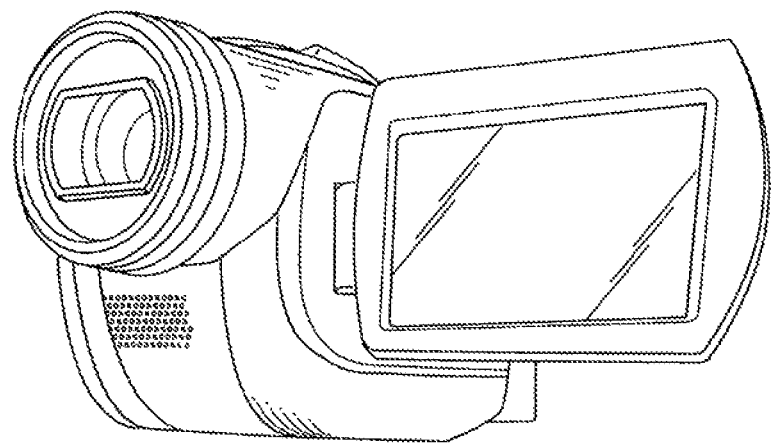
FIG. 33A is an example of an external view of a video camera according to Embodiment 4.
Figure 33B:
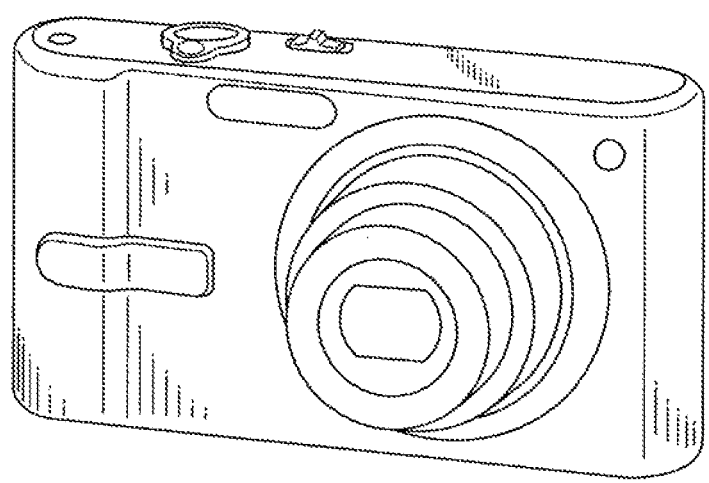
FIG. 33B is an example of an external view of a digital still camera according to Embodiment 4.
Figure 35:
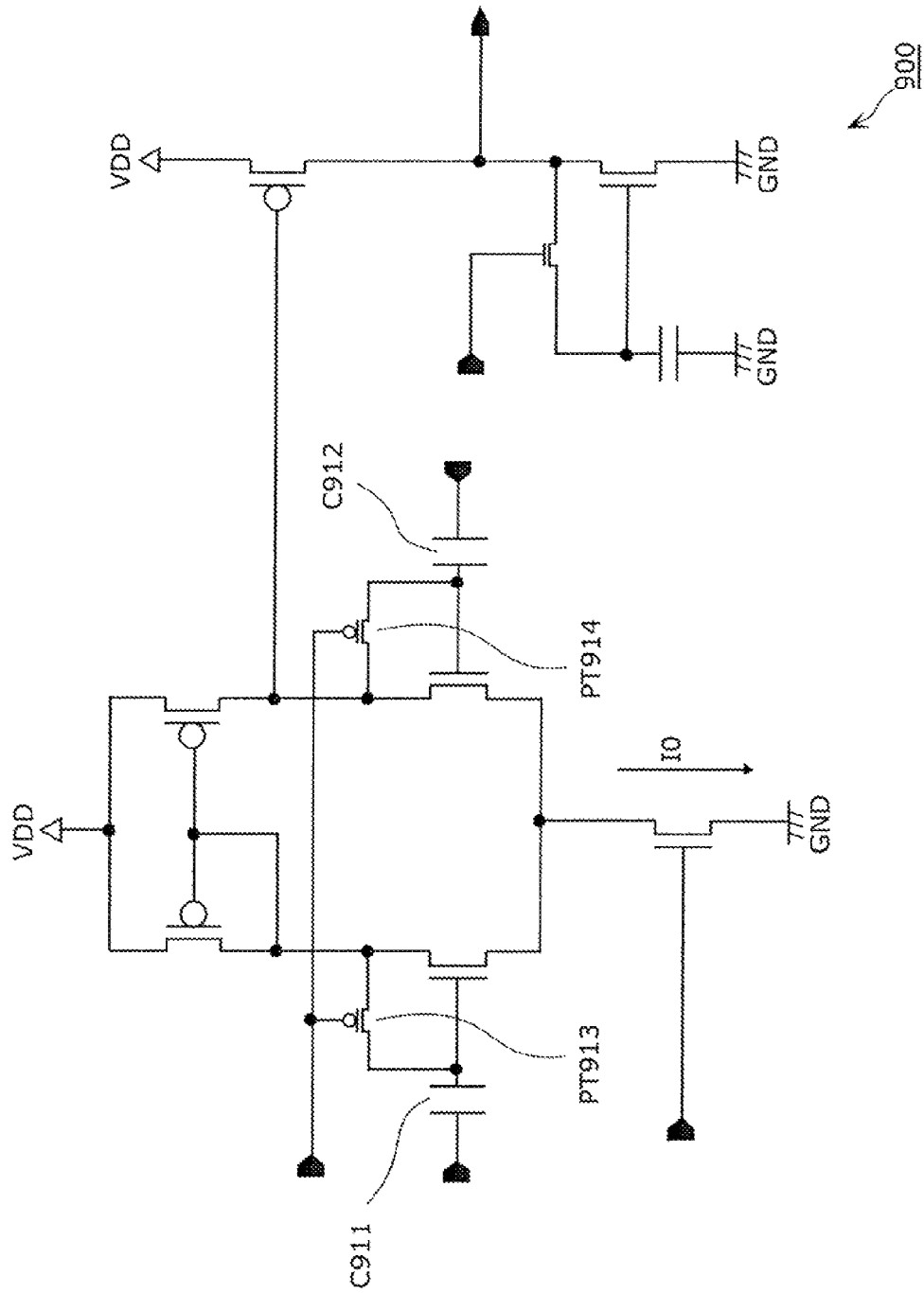
FIG. 35 is a circuit diagram illustrating a configuration of a comparator according to a conventional solid-state imaging device.

The solid-state imaging devices according to Embodiments 1 to 3 may be used as an imaging device (an image input device) in an imaging apparatus such as a video camera illustrated in FIG. 33A, a digital still camera illustrated in FIG. 33B, and a camera module for a mobile device such as a mobile phone.

FIG. 34 is a block diagram illustrating an example of a configuration of an imaging apparatus (camera) according to the present disclosure. As FIG. 34 illustrates, an imaging apparatus 400 according to Embodiment 4 includes: an optical system including a lens 461; an imaging device 462; a camera signal processing circuit 463; a system controller 464; and the like. The lens 461 forms an image of image light from an object on the imaging surface of the imaging device 462. The imaging device 462 outputs an image signal obtained by converting the image light, whose image was formed on the imaging surface by the lens 461, into an electric signal on a per-pixel basis. The solid-state imaging device according to Embodiment 1 to 3 is used as the imaging device 462.

The camera signal processing circuit 463 performs various signal processing on the image signal output from the imaging device 462. The system controller 464 performs control on the imaging device 462 and the camera signal processing circuit 463.

As described above, the imaging apparatus 400 includes the imaging device 462 which reduces the time required for AD conversion and provides a high frame rate.

The solid-state imaging device and the imaging apparatus including the solid-state imaging device according to one or more embodiments have been described above based on the embodiments. However, the present disclosure is not limited to the above embodiments. Various modifications of the embodiments as well as embodiments resulting from arbitrary combinations of structural elements of different embodiments that may be conceived by those skilled in the art are intended to be included within the scope of the present disclosure as long as these do not depart from the essence of the present disclosure.

For example, the above embodiments have described that the logic swing and delay adjusting circuit delays a control signal and reduces the amplitude of the control signal; however, the logic swing and delay adjusting circuit may delay the control signal without reducing the amplitude of the control signal. Alternatively, the logic swing and delay adjusting circuit may reduce the amplitude of the control signal without delaying the control signal. A solid-state imaging device including such a logic swing and delay adjusting circuit also produces the advantageous effects similar to those of the solid-state imaging devices according to the above embodiments. In other words, the respective AD converting units can be controlled by a control signal approximately simultaneously. Specifically, the AD converting units perform AD conversion approximately simultaneously. Accordingly, compared with the case where the AD converting units in different columns operate at different times, the time required for AD conversion can be reduced, thereby providing a high frame rate.

In addition, the processing units of the solid-state imaging devices according to the above embodiments are typically realized as LSIs which are integrated circuits. The structural units may be made as separate individual chips, or some or all of them may be made as a single chip.

In addition, the means for circuit integration is not limited to an LSI, and implementation with a dedicated circuit or a general-purpose processor is also available. It is also possible to use a Field Programmable Gate Array (FPGA) that is programmable after the LSI is manufactured, or a reconfigurable processor in which connections and settings of circuit cells within the LSI are reconfigurable.

In addition, some of the functions or configuration of the solid-state imaging devices according to the above embodiments may be combined.

In addition, all the numerals used in the above description are non-limiting exemplary ones for specifically explaining the present disclosure, and thus should not be interpreted as limiting the present disclosure. Furthermore, logic levels represented by High and Low and switching states represented by ON and OFF are non-limiting exemplary ones for specifically explaining the present disclosure. Thus, it is also possible to achieve an equivalent result by differently combining some of the exemplary logic levels and switching states. In addition, the n-type and p-type of the transistors etc. are shown as exemplary ones for specifically explaining the present disclosure. Thus, it is also possible to achieve an equivalent result when the n-type and p-type are inverted. In addition, the connection relationships between the structural elements are non-limiting exemplary ones for specifically explaining the present disclosure, and thus should not be interpreted as limiting the present disclosure.

In addition, the functional blocks in the block diagrams are non-limiting exemplary ones. Thus, some of the functional blocks may be integrated into a single functional block, one of the functional blocks may be divided into plural blocks, and/or one or more of the functions of one of the functional blocks may be moved to another one of the functional blocks. In addition, similar functions of some of the functional blocks may be executed by a single hardware or software item in parallel or in a time division manner.

Although the above description relates to an example using MOS transistors, the present disclosure includes an example using other kinds of transistors.

Moreover, the circuit configurations illustrated in the circuit diagrams described above are examples, and the present disclosure is not limited to the circuit configurations. In other words, the present disclosure also includes a circuit that obtains the characteristic functions of the present disclosure in the same manner as the circuit configurations above. For example, the present disclosure also includes a configuration in which an element such as a transistor, a resistance element, and a capacitive element is connected to another element in series or parallel to the extent that the same functions as those of the circuit configurations above can be achieved. To put it another way, the term "connected" in the above embodiments is not limited to a case where two terminals (nodes) are directly connected, but includes a case where the two terminals (nodes) are connected via an element to the extent that the same functions can be achieved.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The solid-state imaging device according to the present disclosure facilitates reduction in AD conversion time without substantially increasing the circuit area and power consumption. Accordingly, the solid-state imaging device is useful for a high-performance camera which is required to provide high frame rate, such as a digital still camera, a video camera, a on-vehicle camera, a security camera, or a camera for medical use.

The invention claimed is:

1. A solid-state imaging device comprising:
    a pixel unit including a plurality of pixels arranged in rows and columns, the pixel unit being configured to generate pixel signals according to an amount of incident light;
    an analog-to-digital (AD) converting unit which is disposed for each of the columns of the pixel unit, the AD converting unit being configured to perform digital conversion on each of the pixel signals output from the pixels in the column;
    a control unit configured to generate a control signal for controlling the digital conversion performed by the AD converting unit; and
    an adjusting circuit disposed in a signal path for supplying the control signal from the control unit to the AD converting unit, the adjusting circuit at least reducing an amplitude of the control signal.

2. The solid-state imaging device according to claim 1, further comprising
    a reference signal generating unit configured to generate a ramp signal having a voltage value which varies along a slope,
    wherein the AD converting unit includes:
    a comparator which compares each of the pixel signals with the ramp signal; and a counter unit which counts a time period taken by an output of the comparator to be inverted by a change in a magnitude relationship between the each of the pixel signals and the ramp signal, and the control signal is a reset signal for executing auto zero of the comparator.

3. The solid-state imaging device according to claim 1, wherein the AD converting unit is a ΔΣ AD converter including a sample and hold circuit which samples and holds each of the pixel signals, and the control signal is a control clock for the sample and hold circuit.

4. The solid-state imaging device according to claim 1, wherein the AD converting unit is a ΔΣ AD converter including a switched capacitor circuit, and the control signal is a control clock for the switched capacitor circuit.

5. The solid-state imaging device according to claim 1, wherein the adjusting circuit includes:

a CMOS logic circuit which receives the control signal generated by the control unit and outputs a signal of high level or low level according to a voltage of the control signal; and a first resistor having: a first terminal connected to an output terminal of the CMOS logic circuit; and a second terminal electrically connected to the AD converting unit.

6. The solid-state imaging device according to claim 5, wherein the adjusting circuit further includes a second resistor connected between a power supply and the second terminal of the first resistor.

7. The solid-state imaging device according to claim 5, wherein the adjusting circuit further includes a third resistor connected between a ground and the second terminal of the first resistor.

8. The solid-state imaging device according to claim 5, wherein the adjusting circuit further includes:

a second resistor;

a first switch connected in series to the second resistor;

a third resistor; and a second switch connected in series to the third resistor, the second resistor and the first switch are connected between a power supply and the second terminal of the first resistor, the third resistor and the second switch are connected between a ground and the second terminal of the first resistor, and when the CMOS logic circuit outputs the signal of low level, the first switch is on, and when the CMOS logic circuit outputs the signal of high level, the first switch is off, and when the CMOS logic circuit outputs the signal of high level, the second switch is on, and when the CMOS logic circuit outputs the signal of low level, the second switch is off.

9. The solid-state imaging device according to claim 7, wherein the third resistor is a variable resistor.

10. The solid-state imaging device according to claim 6, wherein the second resistor is a variable resistor.

11. The solid-state imaging device according to claim 5, wherein the first resistor has a resistance value greater than or equal to twice a line resistance value of a line connecting the adjusting circuit and one of the AD converting units which is located farthest from the adjusting circuit.

12. The solid-state imaging device according to claim 5, wherein the first resistor is a variable resistor.

13. The solid-state imaging device according to claim 1, wherein the adjusting circuit includes:

a CMOS logic circuit having a first power supply terminal and a second power supply terminal which is connected to a ground, the CMOS logic circuit receiving the control signal generated by the control unit and outputting a signal of high level or low level according to a voltage of the control signal; and an M-stage PMOS transistor including one or more PMOS transistors connected in series and disposed between the first power supply terminal and a power supply, M being an integer of one or greater, and each of the one or more PMOS transistors is a diode-connected transistor.

14. The solid-state imaging device according to claim 1, wherein the adjusting circuit includes:

a CMOS logic circuit having: a first power supply terminal connected to a power supply; and a second power supply terminal, the CMOS logic circuit receiving the control signal generated by the control unit and outputting a signal of high level or low level according to a voltage of the control signal; and an N-stage NMOS transistor including one or more NMOS transistors connected in series and disposed between the second power supply terminal and a ground, N being an integer of one or greater, and each of the one or more NMOS transistors is a diode-connected transistor.

15. The solid-state imaging device according to claim 1, wherein the adjusting circuit includes:

a CMOS logic circuit having: a first power supply terminal and a second power supply terminal, the CMOS logic circuit receiving the control signal generated by the control unit and outputting a signal of high level or low level according to a voltage of the control signal;

an M-stage PMOS transistor including one or more PMOS transistors connected in series and disposed between the first power supply terminal and a power supply, M being an integer of one or greater; and an N-stage NMOS transistor including one or more NMOS transistors connected in series and disposed between the second power supply terminal and the ground, N being an integer of one or greater, and each of the one or more PMOS transistors is a diode-connected transistor and each of the one or more NMOS transistors is a diode-connected transistor.

16. An imaging apparatus comprising
the solid-state imaging device according to claim 1.

* * * * *